United States Patent
Mouline et al.

(10) Patent No.: US 9,391,855 B2
(45) Date of Patent: Jul. 12, 2016

(54) SYSTEMS AND METHODS FOR SIMULATING A NOTIFICATION SYSTEM

(71) Applicant: Everbridge, Inc., Glendale, CA (US)

(72) Inventors: Imad Mouline, Braintree, MA (US); William Ryan Breen, Melrose, MA (US)

(73) Assignee: Everbridge, Inc., Glendal, CA (US)

( * ) Notice: Subject to any disclaimer, the term of this patent is extended or adjusted under 35 U.S.C. 154(b) by 381 days.

(21) Appl. No.: 13/834,068

(22) Filed: Mar. 15, 2013

(65) Prior Publication Data

US 2013/0304904 A1 Nov. 14, 2013

Related U.S. Application Data

(60) Provisional application No. 61/645,004, filed on May 9, 2012.

(51) Int. Cl.
*H04M 3/22* (2006.01)
*H04L 12/26* (2006.01)
*H04M 3/32* (2006.01)
*H04L 12/24* (2006.01)

(52) U.S. Cl.
CPC .......... *H04L 43/045* (2013.01); *H04L 41/5009* (2013.01); *H04L 41/5096* (2013.01); *H04M 3/323* (2013.01); *H04M 2203/2016* (2013.01); *H04M 2242/04* (2013.01)

(58) Field of Classification Search
CPC ................. H04M 2242/04; H04M 2203/2016; H04M 3/323
See application file for complete search history.

(56) References Cited

U.S. PATENT DOCUMENTS

| | | | | |
|---|---|---|---|---|
| 5,436,965 | A * | 7/1995 | Grossman | H04M 3/36 379/112.01 |
| 5,761,272 | A * | 6/1998 | Williams | H04M 3/323 379/10.02 |
| 5,937,165 | A * | 8/1999 | Schwaller | H04L 12/2697 709/224 |
| 6,038,544 | A * | 3/2000 | Machin | G06Q 10/063112 235/386 |
| 6,160,871 | A * | 12/2000 | DuRee | H04M 3/323 379/10.02 |
| 6,198,739 | B1 * | 3/2001 | Neyman | H04M 7/00 370/353 |
| 6,226,360 | B1 * | 5/2001 | Goldberg | H04M 1/274575 379/67.1 |

(Continued)

OTHER PUBLICATIONS

International Search Report and Written Opinion issued for PCT/US2013/039709, dated Dec. 2, 2013, 11 pages.

(Continued)

*Primary Examiner* — Emmanuel L Moise
*Assistant Examiner* — Julian Chang
(74) *Attorney, Agent, or Firm* — Norton Rose Fulbright US LLP

(57) ABSTRACT

Systems and methods for a cloud management system which utilizes both technical and business metrics to achieve operational efficiencies. The systems and methods can be used to provide an elastic infrastructure model for an emergency notifications system which delivers near infinite scale with guaranteed near 100% uptime. In an embodiment, a mass recipient emulator can be utilized for testing of the notifications system with actual phone call or message exchange.

25 Claims, 21 Drawing Sheets

(56) References Cited

U.S. PATENT DOCUMENTS

| | | | | |
|---|---|---|---|---|
| 6,269,150 | B1* | 7/2001 | Herrbach | H04M 3/323 370/244 |
| 6,292,909 | B1* | 9/2001 | Hare | H04L 12/2697 379/10.01 |
| 6,324,492 | B1* | 11/2001 | Rowe | H04L 12/2697 370/241 |
| 6,421,424 | B1* | 7/2002 | Creamer | H04M 3/323 379/1.01 |
| 6,519,228 | B1* | 2/2003 | Creamer | H04L 12/2697 370/252 |
| 6,560,634 | B1 | 5/2003 | Broadhurst | |
| 6,587,543 | B1* | 7/2003 | Howard | H04M 3/24 379/1.02 |
| 6,597,694 | B1* | 7/2003 | Fondekar | H04L 12/2697 370/389 |
| 6,724,865 | B1* | 4/2004 | Michel | H04M 11/08 379/10.02 |
| 6,795,395 | B1* | 9/2004 | Khasnabish | H04M 3/323 370/230 |
| 6,845,352 | B1* | 1/2005 | Wang | H04L 41/5009 702/182 |
| 7,596,484 | B1* | 9/2009 | Patel | H04L 43/50 702/182 |
| 7,653,700 | B1 | 1/2010 | Bahl et al. | |
| 7,680,250 | B1* | 3/2010 | Zilles | H04L 12/2697 379/10.03 |
| 8,966,036 | B1* | 2/2015 | Asgekar | G06F 15/173 707/706 |
| RE45,606 | E* | 7/2015 | Neyman | |
| 9,118,764 | B2* | 8/2015 | Mistry | H04M 3/523 |
| 2002/0012428 | A1* | 1/2002 | Neyman | H04M 3/42127 379/242 |
| 2002/0176543 | A1* | 11/2002 | Creamer | H04M 3/28 379/10.02 |
| 2004/0008825 | A1* | 1/2004 | Seeley | H04M 3/22 379/32.01 |
| 2004/0210670 | A1 | 10/2004 | Anerousis et al. | |
| 2006/0117038 | A1 | 6/2006 | Toebes et al. | |
| 2008/0046267 | A1* | 2/2008 | Romano | G06Q 10/10 705/1.1 |
| 2009/0060149 | A1* | 3/2009 | Pavelko | H04M 3/5158 379/88.17 |
| 2009/0112586 | A1* | 4/2009 | Williams | G10L 15/01 704/239 |
| 2009/0132648 | A1 | 5/2009 | Swildens et al. | |
| 2009/0147926 | A1* | 6/2009 | Fahrenthold | H04M 7/006 379/1.01 |
| 2009/0190725 | A1* | 7/2009 | Yang | H04M 3/50 379/10.02 |
| 2009/0307094 | A1 | 12/2009 | Manos | |
| 2009/0327489 | A1 | 12/2009 | Swildens et al. | |
| 2010/0223364 | A1 | 9/2010 | Wei | |
| 2010/0319004 | A1 | 12/2010 | Hudson et al. | |
| 2011/0054893 | A1* | 3/2011 | Williams | G10L 15/07 704/235 |
| 2011/0055312 | A1 | 3/2011 | Purdy, Sr. | |
| 2011/0093522 | A1 | 4/2011 | Chen et al. | |
| 2011/0137973 | A1 | 6/2011 | Wei et al. | |
| 2011/0179132 | A1 | 7/2011 | Mayo et al. | |
| 2011/0276951 | A1 | 11/2011 | Jain | |
| 2011/0282973 | A1 | 11/2011 | Josefsberg et al. | |
| 2012/0079115 | A1 | 3/2012 | Richardson et al. | |
| 2013/0055394 | A1* | 2/2013 | Beresnevichiene | G06F 21/577 726/24 |
| 2013/0085868 | A1* | 4/2013 | Jordan | G06Q 30/0275 705/14.71 |
| 2013/0129060 | A1* | 5/2013 | Gopalakrishnan | G06Q 30/02 379/93.01 |
| 2013/0136248 | A1* | 5/2013 | Kaiser-Nyman | H04M 3/44 379/216.01 |
| 2014/0278264 | A1* | 9/2014 | Bukhin | G06F 17/5004 703/1 |

OTHER PUBLICATIONS

International Search Report and Written Opinion issued for PCT/US2013/038366, dated Oct. 4, 2013, 10 pages.

The extended European Search Report issued for European Patent Application No. 13787513.1, dated Dec. 18, 2015, 7 pages.

* cited by examiner

| Overview | Visibility | Control | Administration | |

Reports - Create Report

☐ Create report: Gauge chart

Query a report and view the result by different chart type

Conditions

| | |
|---|---|
| Application Name: | [ccp1 ⬥] |
| Chart type: | [Time series chart ⬥] |
| Web Analytics Metrics: | ☐ Unique Visitors  ☐ Visits  ☐ Pageviews |
| | ☐ GOAL_NAME |
| Cloud Metrics: | ☐ Cost  ☐ CPU Usage  ☐ Bandwidth Usage |
| Monitoring Metrics: | ☐ Availability  ☐ Performance |
| Derived Metrics: | ☐ Cost per visitor  ☐ Cost per conversion |
| Time period: | ⦿ [Last 30 days ⬥] ✓ |
| | ○ [        ] [00:00 ⬥] To: [00:00 ⬥] |
| Time interval: | [1 hour ⬥] |

[Create]

*FIG. 6A*

| Overview | Visibility | Control | Administration | Help \| Support \| Logout |
|---|---|---|---|---|
| Infrastructure | Traffic Shaping | Alerting | | |

Control - Manage infrastructure - List of infrastructure profiles

☐ List of infrastructure profiles

You can manage your infrastructure here

| Profile Name | Number of Instances | Cost(s) | Performance (Sec) | Utilization (%) | |
|---|---|---|---|---|---|
| ccp1 | 0 | 0.00 | | | ⊟ ⊞ |
| ▼Text Profile | 8 | ▭ | ▭ | ▭ | ⊟ ⊞ |
| ▼Amazon | 8 | ▭ | ▭ | ▭ | |
| ▼US West | 2 | ▭ | ▭ | ▭ | ⊟ ⊞ |
| ▼us-west-1b | 1 | ▭ | ▭ | ▭ | |
| I-4a06560e | | ▭ | ▭ | ▭ | ☒ |
| ▼us-west-1a | 1 | ▭ | ▭ | | |
| I-e56520a2 | | ▭ | ▭ | | ☒ |
| ▼US East | 3 | ▭ | ▭ | ▭ | ⊟ ⊞ |
| ▼us-east-1c | 1 | ▭ | ▭ | ▭ | |
| I-46ebb229 | | ▭ | ▭ | ▭ | ☒ |
| ▼us-east-1d | 1 | ▭ | ▭ | | |
| I-5739bb3b | | ▭ | ▭ | | ☒ |
| ▼us-east-1a | 1 | 0.38 | ▭ | ▭ | |
| I-60232a00 | | 0.38 | ▭ | ▭ | ☒ |
| ▼ Asia Pacific Southeast | 1 | 0.51 | | | ⊟ ⊞ |
| ▼ap-southeast-1b | 1 | 0.51 | | | |
| I-bdc38be8 | | 0.51 | | | ☒ |
| ▼ Asia Pacific Northeast | 1 | 0.53 | ▭ | | ⊟ ⊞ |
| ▼ap-northeast-1b | 1 | 0.53 | ▭ | | |
| I-56c5ce57 | | 0.53 | ▭ | | ☒ |
| ▼EU West | 1 | 0.56 | ▭ | | ⊟ ⊞ |
| ▼eu-west-1c | 1 | 0.56 | ▭ | | |
| I-1eo2c457 | | 0.56 | ▭ | | ☒ |

*FIG. 8*

| Overview | Visibility | Control | Administration | Help \| Support \| Logout |
|---|---|---|---|---|
| Infrastructure | Traffic Shaping | Alerting | | |

Control - Infrastructure - Manage Application Profiles

☐ Manage Application Profiles

Display list of Cloud instances. Mouse - over or click icons for more actions.

| Application Name | Host Name | Cloud Account | Instances | Cost | Perf | Util | |
|---|---|---|---|---|---|---|---|
| myRetailer | www.abcdef.com | Amazon EC2 | 5 | ▭ | ▨ | ▨ | ⊟⊞☒ |
| | | Rackspace | 3 | ▨ | ▭ | ▭ | ⊟⊞☒ |
| | | GOGrid | 2 | ▩ | ▨ | ▭ | ⊟⊞☒ |
| mycampaign | www.fedcba.com | Amazon UK | 2 | ▭ | ▭ | ▭ | ⊟⊞☒ |

*FIG. 12*

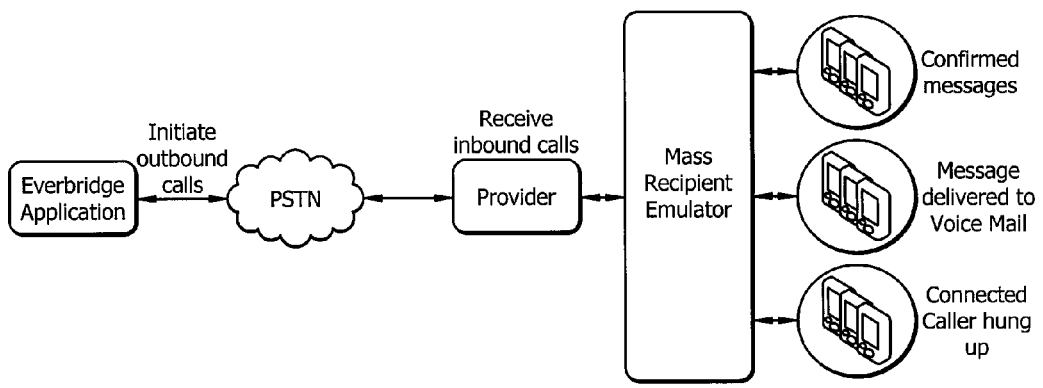

SYSTEMS AND METHODS FOR SIMULATING A NOTIFICATION SYSTEM

CROSS-REFERENCE TO RELATED APPLICATIONS

The present application claims priority to U.S. Provisional Patent Application No. 61/645,004, entitled "Systems and Methods for Metric-Based Cloud Management", filed May 9, 2012, and is related to U.S. patent application Ser. No. 13/834,148, filed Mar. 15, 2013, entitled "Systems And Methods For Distance And Performance Based Load Balancing," filed concurrently herewith, and U.S. patent application Ser. No. 13/834,249, filed Mar. 15, 2013, entitled "Systems And Methods For Cloud-Aware Domain Name System Management," filed concurrently herewith, the disclosures of which are hereby incorporated herein by reference.

FIELD OF THE INVENTION

The present disclosure generally relates to cloud management, and more particularly to metric-based cloud management, such as may be used in conjunction with an emergency notification system.

BACKGROUND

The "Cloud" refers to the delivery of computing as a service, rather than a product. Shared resources, applications, and information are provided to devices (e.g., desktop computers, mobile phones, tablet PCs, servers, etc.) as a utility over a network—typically, the Internet. End users access the remotely-stored applications and information through a web browser or light-weight application, such as a thin client. In this manner, end users no longer have the need for expertise in, or control over, the technology infrastructure that supports them. Cloud application providers strive to give the same or better service and performance than if the applications and/or information were operating or stored locally on the end-users' devices. Cloud providers generally bill their services on a utility computing basis, i.e., the cost will reflect the amount of resources allocated and consumed. Alternatively or additionally, a flat fee pricing model may be used or available.

At the most basic level, often referred to as Infrastructure as a Service (IaaS), cloud service providers offer physical or virtual machines, including storage, processing, load balancing, firewalls, networks and IP addresses, and the like. These resources are supplied on demand from a pool of resources, for example, installed at a data center.

At another level, often referred to as Platform as a Service (PaaS), cloud service providers may also offer a computing platform, which may include an operating system, execution environment, database, web server, and the like. Application developers can develop and run software solutions on the cloud platform without the cost and complexity of buying and managing the underlying hardware and software layers. Furthermore, with some PaaS offerings, the underlying resources can scale automatically to match application demand. In this manner, the cloud user does not have to manually allocate resources.

At a third level, often referred to as Software as a Service (SaaS), cloud providers may install and operate application software in the cloud. This eliminates the need to install and run the application on end users' own computers, thereby simplifying maintenance and support.

Cloud applications are different from other applications, because they are elastic. Applications and/or tasks can be cloned onto multiple virtual machines in the cloud. In this manner, applications can be scaled out to meet changing work demand. In addition, load balancers can distribute processing over a set of virtual machines. This is transparent to end users, who simply see a single access point.

Cloud infrastructures, platforms, or applications can be multi-tenant. In other words, a single machine, platform, or application can serve more than one cloud using entity. Multi-tenancy enables sharing of resources and costs across a large pool of users, advantageously allowing for centralization, peak-load capacity, and improved utilization and efficiency.

While cloud services can provide a great deal of flexibility, efficiency, and other advantages, they are also associated with a number of concerns, such as cost, compliance, visibility, reliability, security, performance, and "noisy neighbors."

For example, since cloud applications are often maintained by a cloud provider which is separate from the cloud user (e.g., a company or other organization) and may involve multiple tenants utilizing a single resource, significant concerns exist about the security of confidential or sensitive information and data, as well as compliance with regulations, such as FISMA, HIPAA, SOX, the EU's Data Protection Directive, and the credit card industry's PCI DSS.

In addition, since costs for cloud services are often dependent on utility pricing and cloud services are often automatically and quickly scalable to handle increases in usage, costs can quickly escalate if not carefully monitored or restricted. Furthermore costs may scale differently between different service providers. Different cloud providers may also provide differently performing services. For instance, at one given time, one cloud provider may perform better than a second cloud provider, or the second cloud provider may be experiencing a partial or total failure. However, at a different time, the second cloud provider may offer better performance than the first provider. Furthermore, since cloud resources are often multi-tenant, from time to time one entity's virtual machine(s) may end up with "noisy neighbors." A "noisy neighbor" is a virtual machine that requests or is using a disproportionately large part of a shared resource. Accordingly, it is often beneficial for an organization to maintain and manage cloud instances with multiple cloud providers. Doing so can be more cost effective, and allow for better overall performance and reliability.

Current cloud management systems provide a number of technical metrics to aid in an entity's management of its cloud instances, including some of the above-mentioned concerns. Such metrics may include the number of operational and/or non-operational cloud instances, central processing unit (CPU) utilization, requests per second, bandwidth utilization, availability, and response times.

SUMMARY

The present invention is directed to systems and methods which provide for cloud management which utilizes both technical and business metrics, to achieve operational efficiencies for a particular business. The systems and methods of embodiments can be used to provide an elastic infrastructure model, such as for use with respect to an emergency notifications system, which delivers near infinite scale and/or with near 100% uptime. In an embodiment, a mass recipient emulator can be utilized for testing of the notifications system with actual phone call or message exchange.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 6A illustrates an example graphical user interface for creating a report, according to an embodiment;

FIG. 8 illustrates an example display for a list of infrastructure profiles, according to an embodiment;

FIG. 12 illustrates a management dashboard for an operation's cloud infrastructure, according to an embodiment;

FIG. 13 illustrates a testing process for a notifications system, according to an embodiment;

FIGS. 17A and 17B illustrate an interactive visibility dashboard interface, according to an embodiment.

DETAILED DESCRIPTION

Systems and methods for cloud management and optimization are disclosed. Embodiments serve both information technology (IT) and business managers, by enabling both to view and control their cloud operations through their business key performance indicators. Only IT managers are served by current cloud management technologies, which merely offer technical metrics, such as the number of operational and/or non-operational cloud instances, central processing unit (CPU) utilization, requests per second, bandwidth utilization, availability, and response times. In disclosed embodiments, business and/or IT managers are served by a cloud management system which provides both technical and business metrics. These business metrics utilized according to embodiments herein may include cloud cost, revenue generation, impressions served, conversion rates, cost per visitor, number of unique visitors, time on site, customer experience, and the like.

The managers or operators of an operation that utilizes cloud services can use both the technical and business metrics to find the "sweet spot" of operational efficiency. The addition of business metrics allows the operators to gain visibility into how the operational environment is affecting business. The operators can analyze tradeoffs between cost, performance, resiliency, and regulatory restrictions for all of the operation's applications. The operators can then proactively control these tradeoffs for all cloud-based deployments to deliver on what their particular operation or business needs. In this manner, the operator can decide what is important for each application and take control by making changes to the operational environment so that it can be as efficient as possible for the particular business. For example, the operator may be able to maintain the same level of service by turning down some resources and reducing cost. Furthermore, an operator may be able to determine whether spending more money can positively impact the business.

Figure 1:
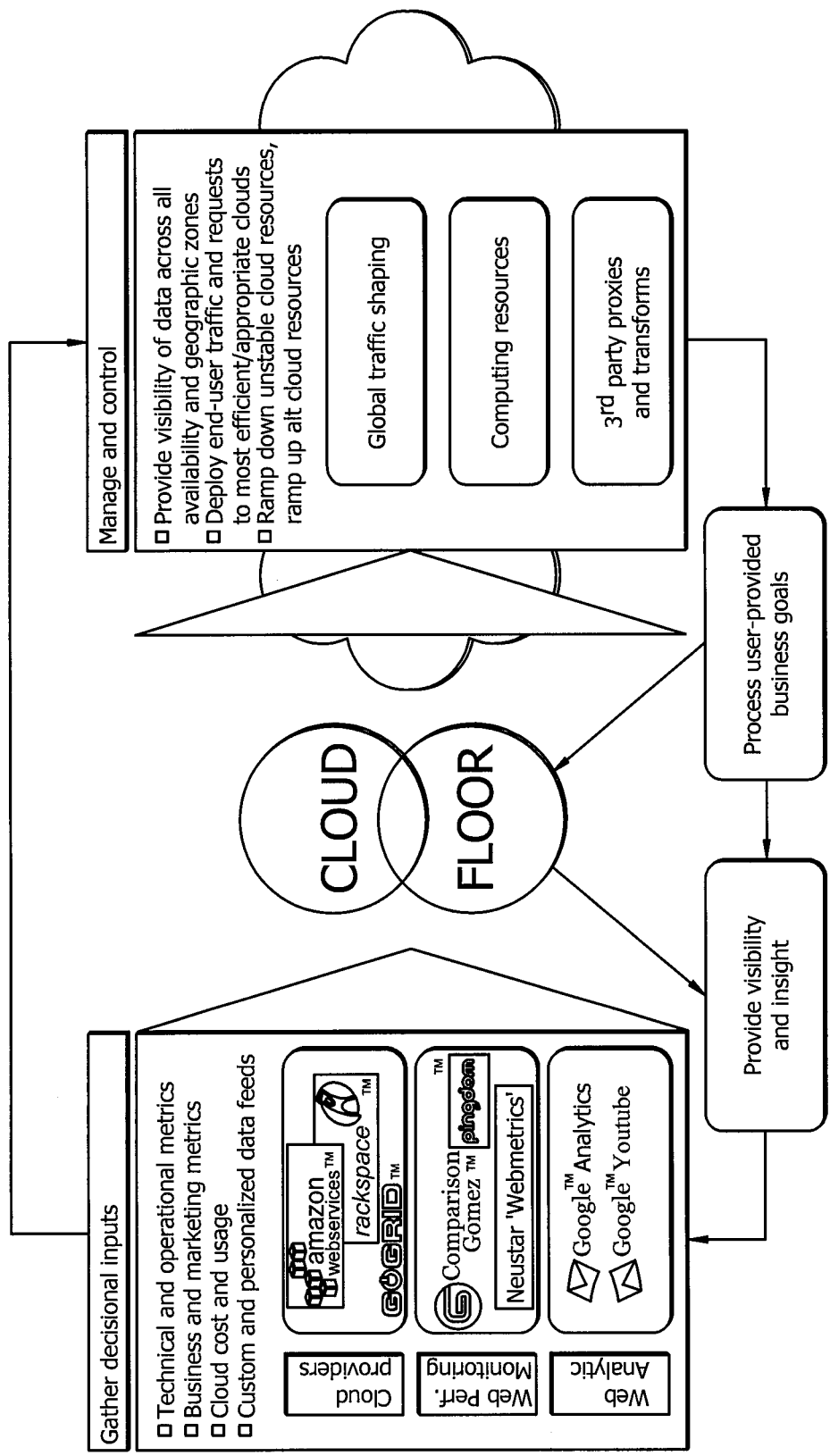
FIG. 1 illustrates a process flow of a cloud management system, according to an embodiment.

As illustrated in FIG. 1, in an embodiment, the cloud management system collects decisional inputs from one or more sources. The decisional inputs may, for example, include technical and operational metrics, business and marketing metrics, cloud cost and usage, and/or custom and personalized data feeds. These inputs may be collected from a variety of sources, including cloud providers (e.g., Amazon Web Services™, Rackspace, GoGrid, etc.), web performance monitoring services (e.g., Compuware Gomez, Pingdom, Neustar® Webmetric®, etc.), web analytics (e.g., Google® Analytics™), or internal probes. The business and marketing metrics can be input by the operator, and used to generate rules to provide flexible and adaptive control of the cloud services.

The decisional inputs are used by the cloud management system to facilitate management and control of the operation's cloud services. Visibility (e.g., using a dashboard interface) is provided according to embodiments of all data across all availability and geographic zones. End-user traffic and requests can be deployed to the most efficient/appropriate cloud services or instances.

In operation according to embodiments, the cloud management system provides global traffic shaping. For example, traffic shaping might entail sending requests to cheaper, faster, and/or more reliable resources, or within certain borders. The system may additionally or alternatively manage computing resources. For instance, unstable cloud resources can be ramped down, and alternate cloud resources can be ramped up in their place. If requests are directed away from certain resources (e.g., due to traffic shaping), the system can shut them down to save money. The system of embodiments can also provide and support third party proxies and transforms. Furthermore, the cloud management system may operate to process user-provided business goals and provide visibility and insight, which can be fed back to the cloud providers, web performance monitoring, and/or web analytics systems.

A cloud management platform adapted according to concepts of the present invention provides a different approach to cloud management. It provides more than technical stats and operational governance. It may be utilized to drive cloud operations to achieve business results and optimization. It may further tie together cloud usage, costs, and performance to business metrics and goals across multiple cloud providers, accounts, and instances.

In an embodiment, the cloud management platform leverages a plurality of mechanisms for control, in addition to real-time alerting capabilities. For example, the cloud management platform can leverage DNS-based traffic shaping through a global hybrid Anycast-Unicast network. In an Anycast system, a lookup request is routed to the topologically nearest node in a group of potential receiving nodes which are all identified by the same destination address. In a Unicast system, a lookup request is routed to a single receiving node identified by a unique address. In the hybrid system, the request can be served by either a nearest one of a plurality of Anycast nodes, or in the event that the nearest Anycast node is heavily or over-loaded (e.g., by a Denial of Service attack), a Unicast node. Moreover, the cloud management system of embodiments provides a cloud resource control to manage computing resources on and off based on business logic and preferences. For instance, cloud instances may be turned on and off, unstable cloud resources can be ramped down, and alternate cloud resources can be ramped up in their place, and if requests are directed away from certain resources (e.g., due to traffic shaping), the system can shut them down to save money.

Figure 2:
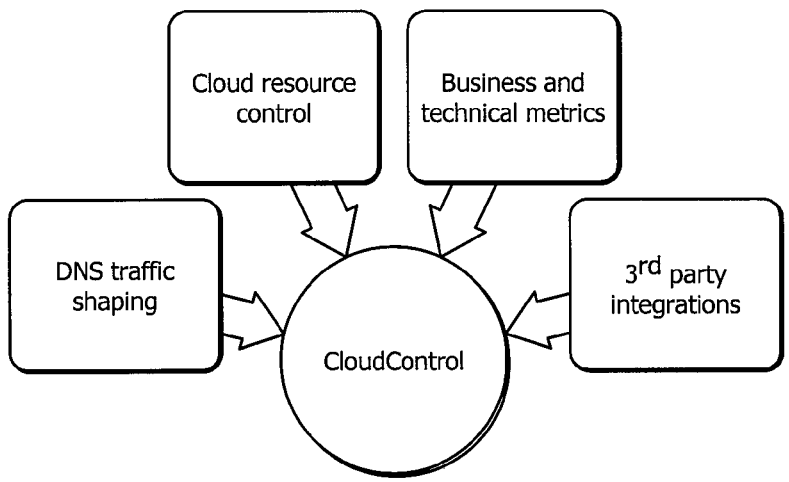
FIG. 2 illustrates inputs to a cloud management system, according to an embodiment.

FIG. 2 illustrates inputs to a cloud management system. The cloud control, i.e., cloud management system, gathers information from DNS traffic shaping systems, from cloud resource control systems, from third parties, and business and technical metrics. The cloud control analyzes all of this information to provide visibility charts to users. The visibility charts may be user-generated.

Figure 3A:
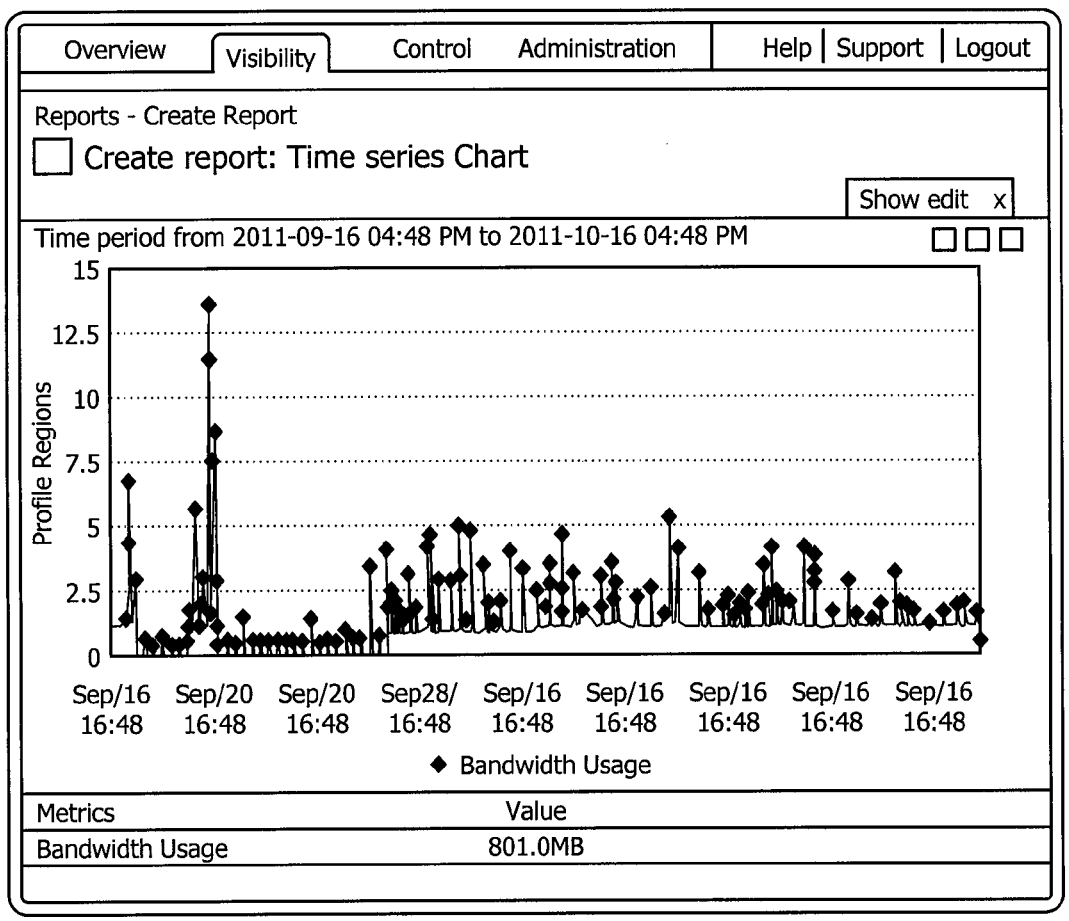
FIGS. 3A and 3B illustrate examples of user-generated visibility charts, according to an embodiment.
Figure 3B:
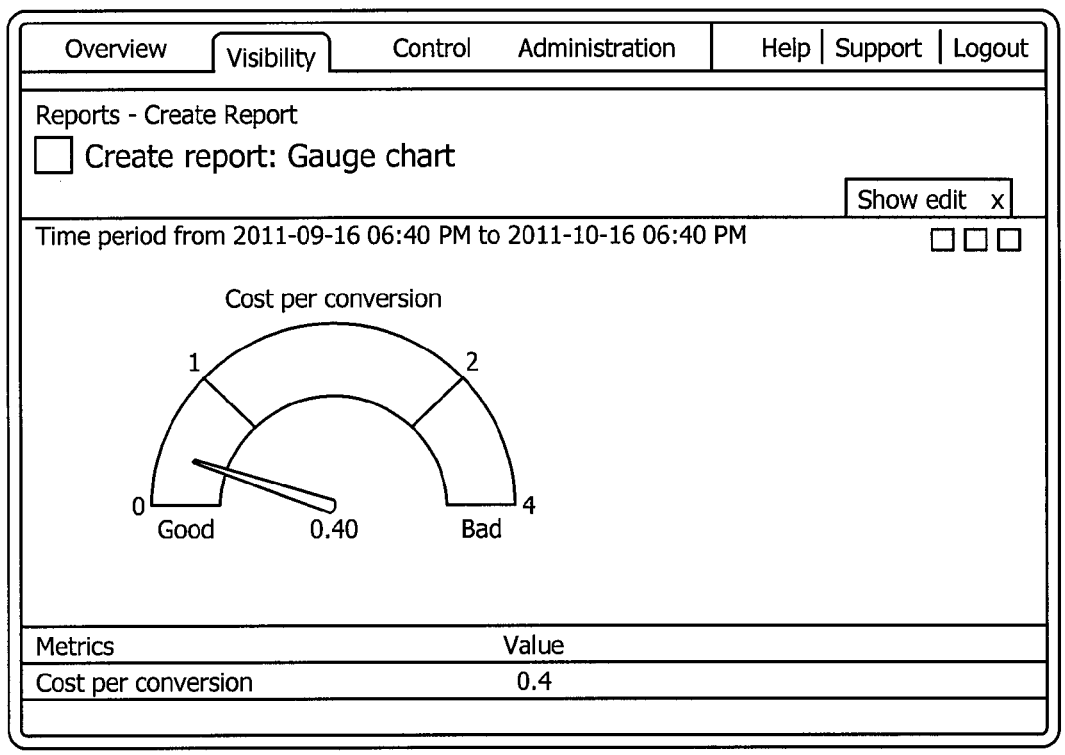

FIGS. 3A and 3B demonstrate examples of user-generated visibility charts, according to an embodiment. The visibility charts may be derived from visibility metrics. In one example, the visibility metrics are derived from the business and technical metrics, including, but not limited to, cloud cost per lead, cloud cost per conversion, advertisement impression to cloud cost, page views to cloud performance, cloud availability to total sales, cloud availability to cloud cost, cloud bandwidth to cost per visitor, cloud bandwidth to CPU usage, cloud performance to cost per conversion, cloud performance to unique visitors, advertisement impressions to bandwidth, and visits to cloud cost.

Using the visibility charts, businesses or other operations can use embodiments of the disclosed cloud management system to improve operating efficiency by locating the most cost effective cloud provider and instances to ensure business targets are met. For instance, a business may desire to manage cloud resources to have 100% availability at the lowest cost. In another example, a major online retailer can use the system to find the lowest cloud cost that will not negatively impact online conversions. Online publications can use the system to determine optimal performance and the cost required to maximize page views and revenues.

Businesses or other operations can also use embodiments of the disclosed cloud management system to improve cost efficiency. Operators can set budgets for their cloud profiles, and may configure a trigger that sends an alert if any cloud resources are nearing an established budget limit. For instance, a digital publishing software start-up can use the system to better understand its cost dynamics through cloud profiles and infrastructure maps. The start-up can use the profiles and maps to find the most cost effective clouds across multiple vendors and across all availability and/or geographic zones. For example, an operator can determine the configuration of cloud resources that provides the best performance for a given budget. Performance can be optimized by minimizing cost given a set of performance requirements, or determining the most cost-efficient high availability resources.

The disclosed system manage cloud resources automatically by monitoring usage, cost, performance, and outcome patterns, and applying tradeoffs automatically to achieve desired business outcomes. For example, the system may learn by looking at trends and anticipate changes in traffic, as well as the correlation between performance and outcomes (such as conversion rates), to proactively turn resources on and off and direct traffic to the appropriate resources get the best possible outcome at the lowest possible price.

In an embodiment, the system manages resources based on historical traffic patterns. The system monitors traffic and maintains historical traffic patterns showing hourly, daily, weekly, monthly, and yearly trends. The system analyzes the historical patterns, and based on the historical patterns, allocate cloud resources effectively. For example, traffic levels for an online retailer may increase starting at the beginning of the workday (e.g., 9 AM), peak in the evening (e.g., 8-10 PM), and drop to a minimum in the early morning (e.g., 3-5 AM). Since the system has learned about these traffic patterns, resources can be automatically turned off at night, but gradually ramped up before any significant traffic comes back. The system may also take into weekly patterns (e.g., more visitors on Monday's than Sunday's), holidays (i.e. Thanksgiving), and the like. In addition to ramping up resources, the system may also ramp down resources based on the traffic data. For example, the system may start turning off resources at 10 PM in anticipation of a drop in traffic levels at 10:15 PM. This can help avoid costs, which are typically charged on an hourly basis.

In an embodiment, the system manages cloud resources based on conversion rates. Based on historical data, the system may learn the correlation between performance and conversion rate. Typically, the better the performance, the higher the conversion rate (and by extension, the revenue) on a retail site. After a certain point, however, increasing system performance only marginally increases the conversion rate and the costs of increasing performance outweigh the benefits (i.e., diminishing returns). The system may calculate the conversion rate against performance and increase resources up to an optimal point, but no further, and decrease resources when appropriate, automatically.

Businesses or other operations can also use embodiments of the disclosed cloud management system to improve resiliency. The system can provide active/active and/or active/passive failover, which continuously monitors performance and usage between multiple resources. If performance is compromised, the system can failover traffic and usage to another cloud instance or provider, automatically and/or in response to operator input. For instance, the system can mitigate the "noisy neighbor" concern (e.g., for an advertising technology vendor) by triggering an alert or directing traffic or usage to another instance if a shared environment experiences a performance lag. Further details regarding a suitable failover system are described in the U.S. Patent Application entitled "Systems And Methods For Cloud-Aware Domain Name System Management," filed concurrently herewith and referred to in the cross-reference to related applications.

Businesses or other operations can also use embodiments of the disclosed cloud management system to improve regulatory compliance. For instance, a trans-national business can use the system to set or select traffic shaping rules to ensure compliance with regulatory standards, such as automatically directing users from Europe to cloud instances in Ireland, or automatically directing users from New York City to cloud instances in Virginia. The most common reason for keeping traffic within certain geographic boundaries is to comply with privacy rules, by ensuring that personally identifiable information is always stored within the appropriate jurisdictional boundaries.

In an embodiment, the cloud management system provides cloud provider host discovery and registration, a cloud infrastructure control panel and hierarchy map, failover and removal of offline hosts from load-balanced pools, re-weighting of load-balanced pools as hosts are added and/or removed, and/or performance-based load balancing.

All of the disclosed benefits of the cloud management system can be provided on-demand using frictionless software, with no need to change existing code, add additional code, install software, or add hardware. This is beneficial since conventional cloud management systems typically require installing or changing code running within each cloud environment.

Figure 4:
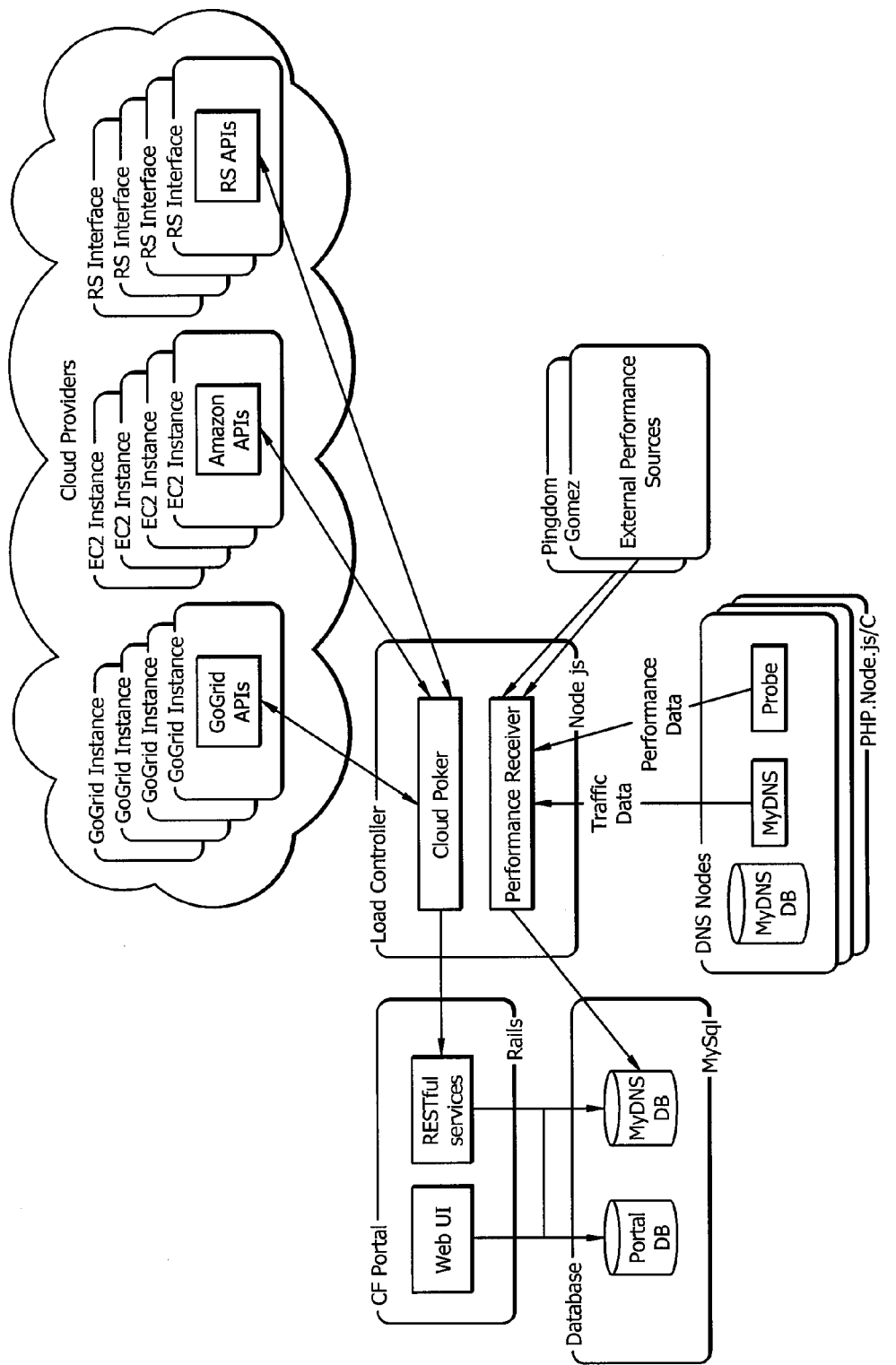
FIG. 4 illustrates an architecture of the cloud management system, according to an embodiment.

FIG. 4 illustrates an architecture of the cloud management system, according to an embodiment, which may be implemented in one or more computer systems. For example, the cloud management system may be implemented in a computer management console under the control of logic performing the described functions. The system may comprise a load controller, portal, and database. The load controller may comprise a cloud poller module and a performance receiver module. The cloud poller module interacts with application programming interfaces (APIs) of third-party cloud providers (e.g., GoGrid, Amazon, and Rackspace) to receive information concerning the cloud instances provided by the providers. The information provided by third-party cloud providers may include technical metrics and operational information. The performance receiver module receives technical metrics such as web performance data (e.g., web page load speed, application or service availability, etc.), from external performance monitoring sources (e.g., Pingdom, Gomez, and Neustar Webmetrics). The performance receiver module may also receive technical metrics such as traffic data and performance data from a Domain Name System (DNS) management system, which may be separate from or integrated with the cloud management system. The performance data may be received from probes established to continuously monitor performance.

The cloud poller module may provide data to a portal, which may comprise a web user interface and Representational State Transfer (RESTful) services. The data may be stored in one or more databases in communication with the portal and its modules. The performance receiver module may also provide acquired data to the one or more databases in communication with the portal modules.

Figure 5:
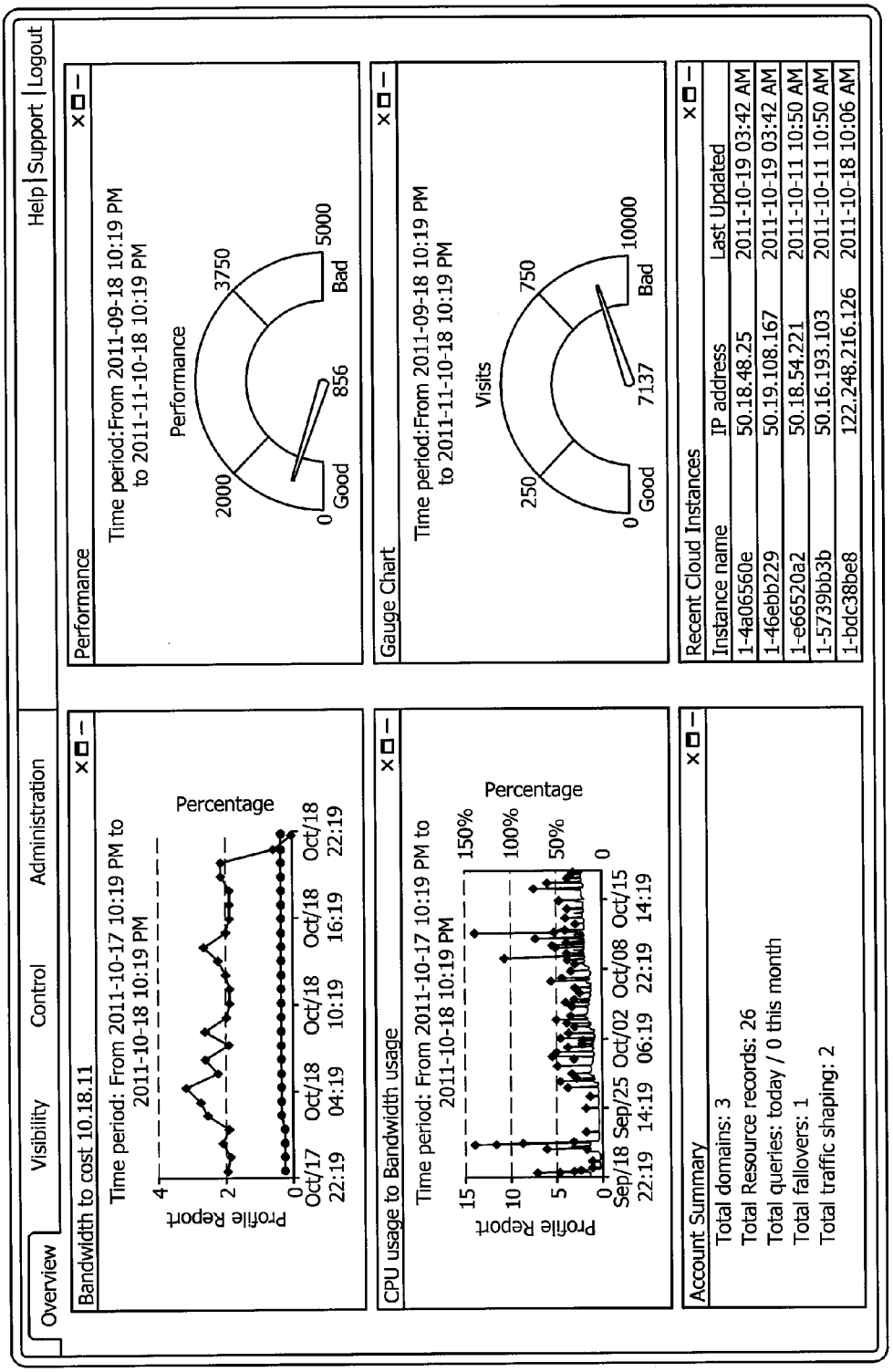
FIG. 5 illustrates an example dashboard provided by the cloud management system, according to an embodiment.

FIG. 5 illustrates an example of a dashboard user interface provided by the portal of the cloud management system, according to an embodiment. The dashboard of the illustrated embodiment unifies technical and business data into one view. It provides real-time visibility across personalized technical and business metrics in one unified dashboard. Operators can gain insight using their unique visibility graphs, such as cloud bandwidth to cost over time. Furthermore, operators can manage, in one view, visibility charts and account information, such as recent cloud instances and daily DNS queries.

Figure 6B:
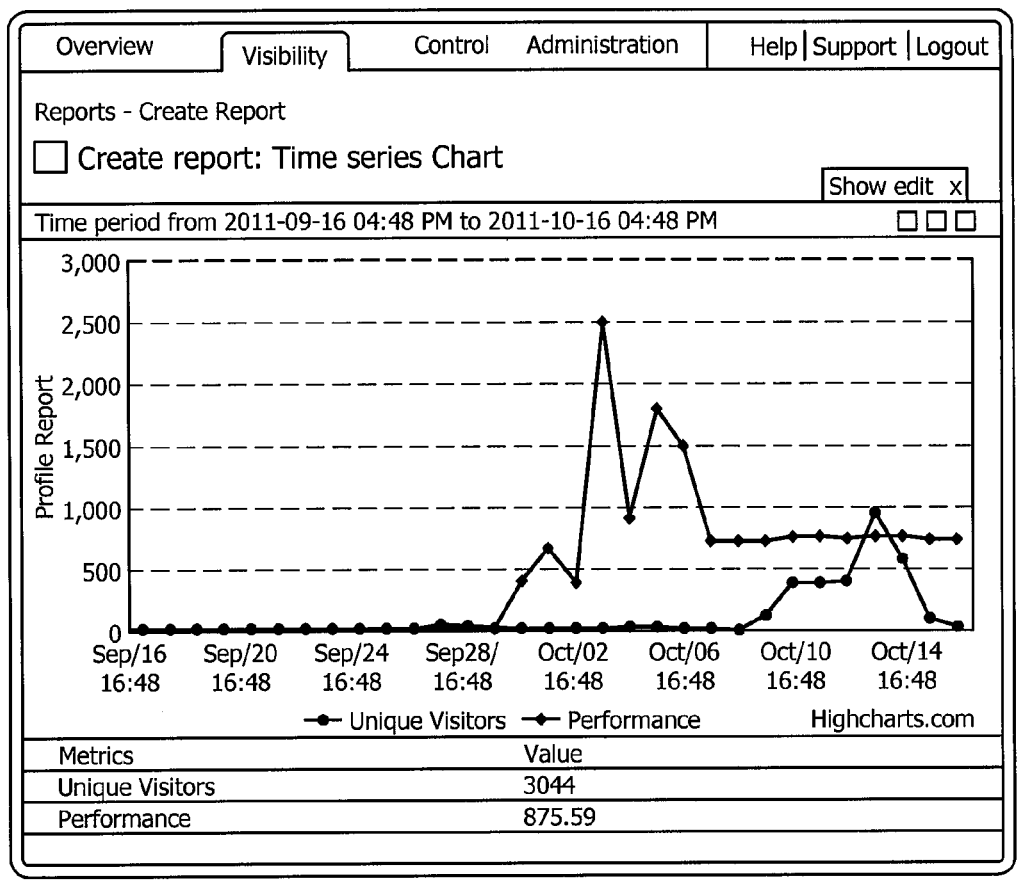
FIG. 6B illustrate a visibility graph, according to an embodiment.

In an embodiment, users of the cloud management system can personalize and create visibility graphs. For instance, as demonstrated in FIG. 6A, users can use a graphical user interface to create a customized report providing information such as web analytic metrics (e.g., unique visitors, visits, pageviews), cloud metrics (e.g., cost, CPU usage, bandwidth usage), monitoring metrics (e.g., availability, performance), derived metrics (e.g., cost per visitor, cost per conversion). The system can leverage off-the-shelf software to pull business and technical metrics from a variety of third-party monitoring vendors, such as Gomez, Pingdom, and Webmetrics. Users can create and then display unique visibility graphs, as demonstrated in FIG. 6B, which display desired metrics regarding cloud operations. Once the visibility graphs are displayed, an operator may easily view the displayed metrics to optimize the cloud resources for desired business results. For instance, an operator may wish to balance performance against cost, and may ramp down instances to until cost per conversion reaches a target goal.

Figure 7:
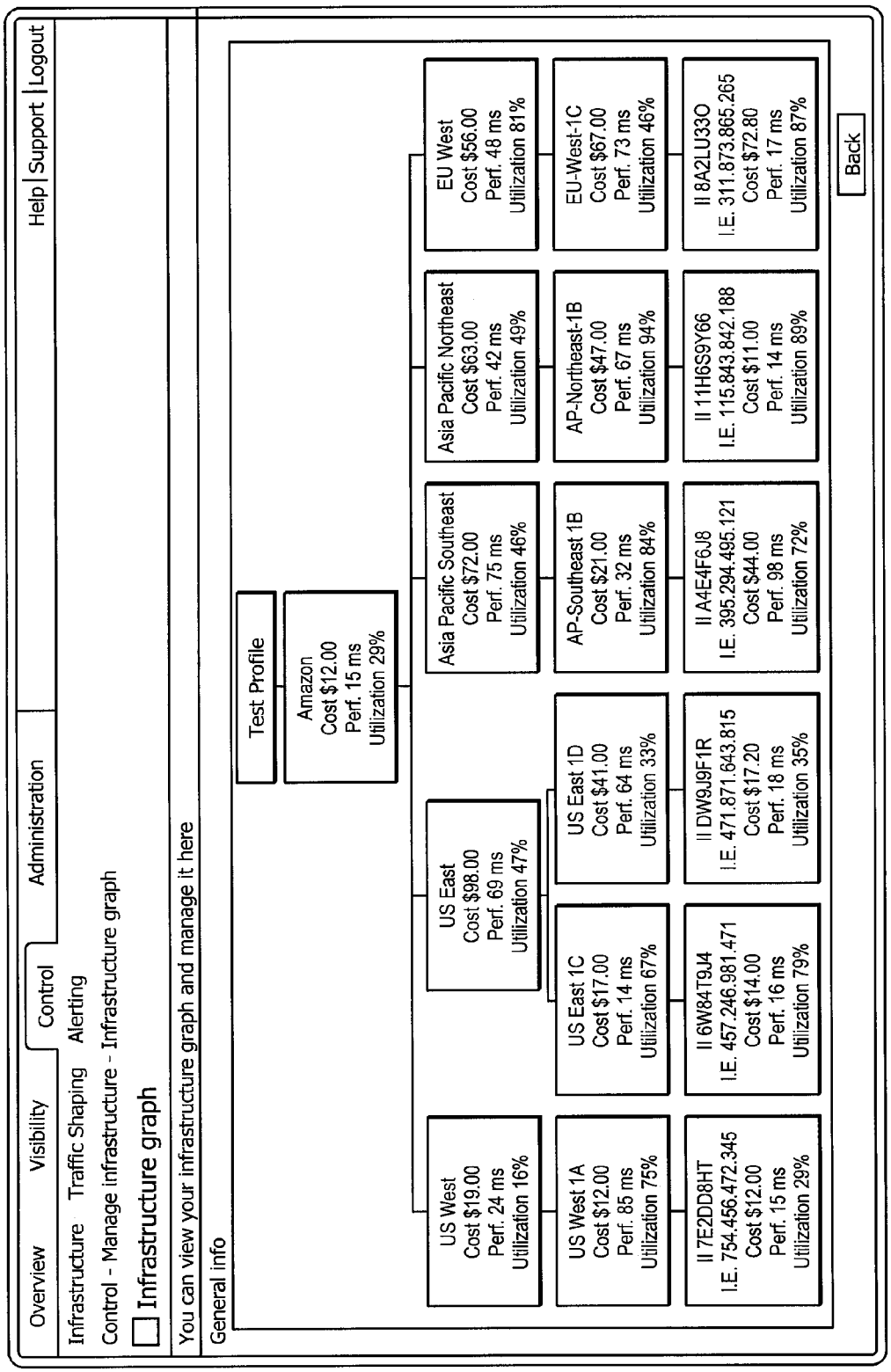
FIG. 7 illustrates a cloud infrastructure hierarchy display, according to an embodiment.

FIG. 7 illustrates a cloud infrastructure hierarchy display, according to an embodiment. The cloud management system (e.g., via the portal) can provide real-time visibility of the operation's cloud topology. It can depict cloud profiles and deployments across all geographies and zones. It can further provide insights into business metrics, such as cloud cost, and technical metrics, such as performance and utilization, across all profiles and cloud instances. In the illustrated embodiment, cloud cost, performance, and utilization is displayed for each cloud instance as well as each geography and zone. This allows an operator to easily compare cloud instances to determine if particular instances are too costly or under or over utilized and manage cloud resources accordingly.

FIG. 8 illustrates an example display for a list of infrastructure profiles, according to an embodiment. As can be seen, cloud instances are shown across multiple providers and zones, for instance, using expandable and collapsible rows. In this manner, multiple cloud vendors or providers can be monitored in a single pane or frame. The display further provides automatic introspection of business metrics, such as cloud cost, and technical metrics, such as performance, and utilization. Operators can set target ranges for business and/or technical metrics for individual cloud profiles and instances. For example, operators can use the cloud resource control to ramp cloud instances up or down in a specific zone to achieve a specific business metric target, such as cloud cost per lead, cloud cost per conversion, advertisement impression to cloud cost, page views to cloud performance, cloud availability to total sales, cloud availability to cloud cost, cloud bandwidth to cost per visitor, cloud bandwidth to CPU usage, cloud performance to cost per conversion, cloud performance to unique visitors, advertisement impressions to bandwidth, and visits to cloud cost. Furthermore, the display may include control objects for managing the cloud instances, such as increasing (+) or decreasing (−) the number of cloud instances or temporarily removing (=) a cloud instance from service.

Figure 9:
FIG. 9 illustrates an example display for traffic shaping rules, according to an embodiment.

FIG. 9 illustrates an example display for traffic shaping rules, according to an embodiment. In an embodiment, operators can use a hybrid Anycast/Unicast DNS network across numerous (e.g., 22) global nodes to implement performance-based traffic shaping. The operator can also monitor and redirect application traffic by a number of different advanced traffic shaping rules to effectively use cloud computing resources. These traffic shaping rules may include: (a) weighted round robin; (b) geographic-based traffic shaping; and (c) performance-based traffic shaping. The cloud management system of embodiments also provides integrations with internally configured probes or with third-party monitoring vendors, such as Gomez, Pingdom, and Webmetrics to obtain technical and business metrics.

Figure 10:
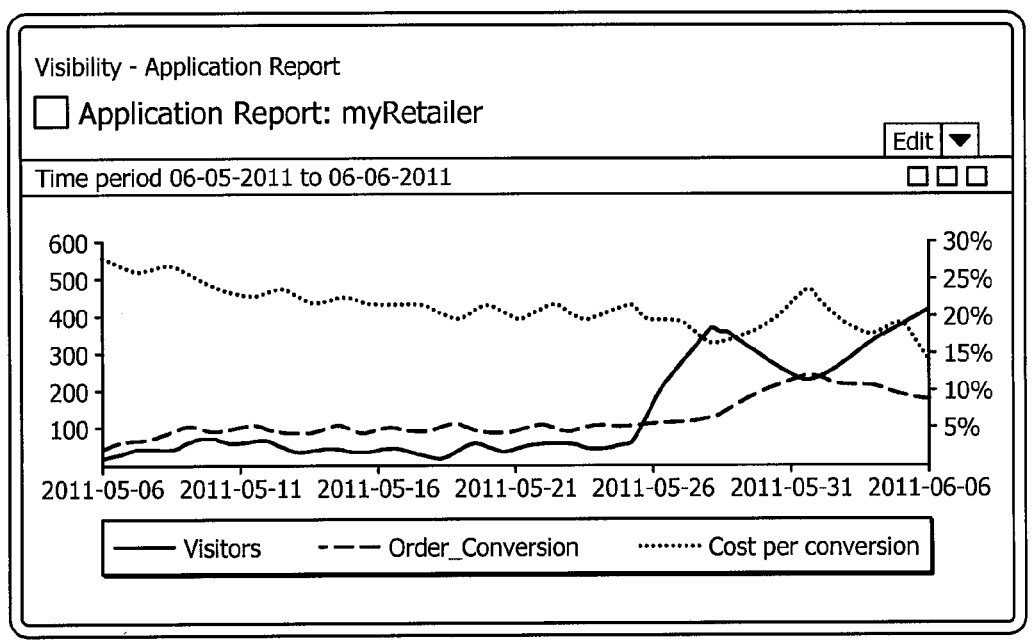
FIGS. 10 and 11 illustrate example reports that can be generated by the cloud management system, according to an embodiment.

FIG. 10 illustrates a sample report that can be generated by the cloud management system, according to an embodiment. As illustrated, the graph can show business metrics (e.g., cost per conversion, order conversion) concurrently with technical metrics (e.g., unique visitors) for a given period of time.

Figure 11:
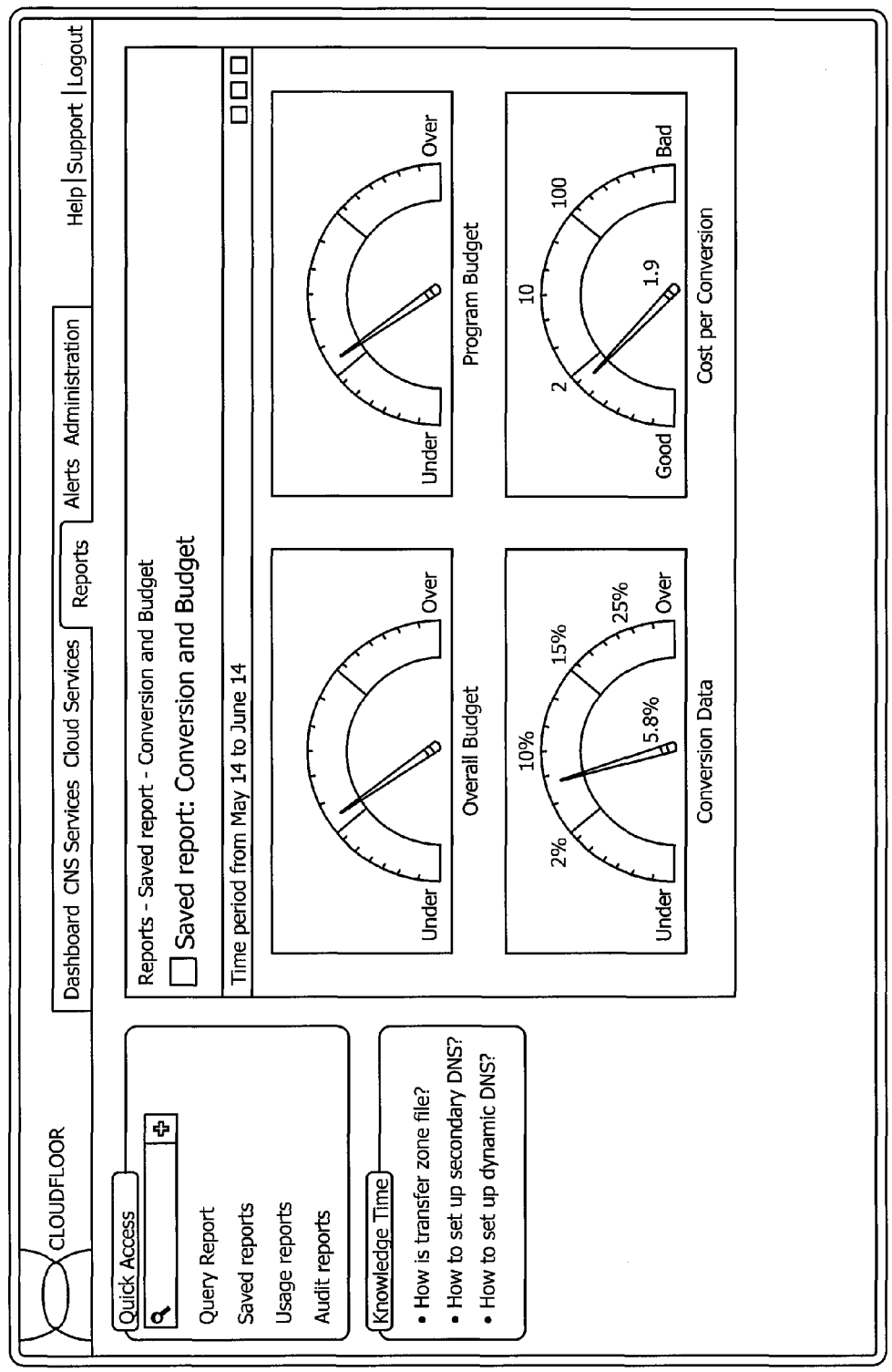

FIG. 11 illustrates another sample report that can be generated by the cloud management system, according to an embodiment. The report displays conversions and budget indicators in a manner that can be easily and quickly understood. As shown, the report can comprise a color-coded (different colors, such as red, yellow, and green, represented here in different levels of shading) speed-o-meter-like rendering of specified metrics to quickly indicate whether a metric indicates healthy or unhealthy performance relative to predetermined or set thresholds.

FIG. 12 illustrates a management dashboard for an operation's cloud infrastructure, according to an embodiment. The dashboard lists the operation's application across multiple different cloud providers. The dashboard also provides an easy-to-read, color-coded (different colors represented here in different levels of shading) indication of the cloud provider's performance relative to monitored technical and/or business metrics. An operator can use the provided cloud controls (−, +, x) to decrease, increase, or remove cloud resources. For instance, the displayed graph indicates that the GOGrid cloud account has exceeded desired cost targets while the Amazon EC2 cloud account is within cost targets. An operator may increase the number of resources available from the Amazon EC2 service while decreasing the number of resources from the GOGrid cloud account to meet desired cost targets.

Using the disclosed cloud management system, cost and performance of services can be proactively balanced. Built-in intelligent monitoring and provider management dynamically routes around failures and congestions. Externalized business logic makes it simple to replace or add external providers while keeping services transparent to end users.

Example Notification Application

The disclosed cloud management system can be used for a notifications system, such as an emergency or non-emergency telecommunications notification system, as may be implemented as a SaaS and/or as may utilize a PaaS and/or IaaS. Examples of notifications systems are disclosed in U.S. Pat. No. 7,664,233 to Kirchmeier et al., entitled "Emergency and Non-Emergency Telecommunications Notification System," which issued on Feb. 16, 2010, and U.S. application Ser. No. 12/579,382 by Putra et al., entitled "Incident Communication System," which was filed on Oct. 14, 2009 and published as U.S. Patent Publication No. 2011/0087510, all of which are incorporated herein in their entireties by reference.

A notifications system hosted in the cloud and managed by the disclosed cloud management system can provide an elastic infrastructure model that delivers near infinite scale, capacity, performance, and processing resources. Such scalable capacity can address an unlimited number of emergency or non-emergency events simultaneously.

In an embodiment, the model comprises both dedicated and dynamic on-demand resources in communication with one or more central data centers. Additionally, a large capacity of traditional phone lines can be combined with a nearly infinite capacity of on-demand communication resources. In other words, large dedicated capacity is augmented by multiple, redundant on-demand communication providers. The model can dynamically route messages around phone carrier congestion to provide the best performance possible.

In an embodiment, a mass recipient emulator is included to provide true message performance benchmarking with actual phone calls. In this manner, the actual performance of services can be modeled using real phone calls or other messages (e.g., text messages) in order to simulate actual real life situations and test performance prior to a real emergency occurring. The emulator can simulate thousands of calls per second to users receiving real calls, and can simulate end users' behavior.

An operator or other tester can specify expected behaviors for users in the model. For example, the steps of hearing the message, confirming notifications, replaying messages, etc., can all be simulated (e.g., by inputting keys through the system to simulate entry on a keypad). In an embodiment, human behaviors are simulated, such that, from the notifications system's perspective, it appears that humans, rather than the emulator, are receiving notifications and returning (or not returning) responses. Such human behaviors can include, without limitation, not answering the phone, hanging up after hearing or during a greeting, listening to the first few (e.g., 30) seconds of a message and then hanging up, listening to the message multiple times, etc.

In an embodiment, the emulator can derive the behaviors by mining historical usage collected by the system across enterprises and organizations, instead of or in addition to using operator-specified behaviors. In this manner, the collective intelligence of multiple enterprises and organizations can be used to derive the optimal notification characteristics in cases of planned or unplanned situations. For example, based on historical data, the optimal way to obtain the largest percentage of recipients to acknowledge receipt of a message and read it/listen to it in its entirety can be determined. For instance, it may be optimal to send an SMS message followed by a phone call. In addition, the optimal message length can also be determined, and the like. This information can be fed back as a model into the mass recipient emulator.

In operation according to embodiments, a model is generated and a sender identifier can be specified and linked to the model. Once a model has been established for testing, a notification can be initiated using the model of the notifications system. The notification is sent out through a public switched telephone network (PSTN) or other network to one or more interactive voice response (IVR) providers. The emulator controls the behavior of calls received at the IVR providers, which may result in a call or message returned to the notifications system. The notifications system then receives the call results. A particular emulator model to be used can be linked to a model of the notifications system using a caller identifier. For example, the IVR provider may receive or determine the caller identifier used by the model of the notifications system. The IVR provider can then use this caller identifier to query the emulator, which may comprise one or more emulation servers. The emulator can use the caller identifier received from the IVR provider to determine which emulator model to use. For instance, the caller identifier may map to a specific emulator model.

FIG. 13 illustrates the testing process, according to an embodiment. The notification system initiates outbound notification calls or messages through the PSTN or other network to one or more IVR providers which receive the calls. When a call is received by an IVR provider, the IVR provider queries the mass recipient emulator as to how to respond to the call. The emulator determines a behavior from a plurality of potential behaviors and responds to the IVR provider with the determined behavior. For instance, the behavior may be a confirmation of receipt of the notification, initiation of a voicemail application, or a connection with a hang-up. The appropriate behavior for each call received may be selected by the emulator from the plurality of potential behaviors using different techniques well-known in the art, including without limitation, round-robin selection, weighted round-robin selection (e.g., some behaviors occur more than others), random selection, statistical probability methods based on data mining, and/or other algorithms. Once a behavior has been determined, the behavior is returned to the IVR provider as a response to the IVR provider's query. The behavior is then utilized to respond to the call from the notifications system, for example, through the PSTN. From the notifications system's perspective, the response to its call or other message appears to be an actual human response.

An example of a simulation process will now be described. In a first step, an outbound call may be placed by an emergency notifications system using caller identifier 123-456-7890 to an IVR provider telephone number 888-888-8888. The call may be routed through the PSTN to the IVR provider.

An automated system at the IVR provider answers the call, identifiers that the call came from 123-456-7890, and queries a simulation system (e.g., using the caller identifier 123-456-7890) or forwards the call to the simulation system. In an embodiment, the simulation system may be a server configured to accept queries from the IVR provider on a specific port through a network (e.g., the Internet). The simulation system will determine a behavior to be performed based on a previously specified technique or algorithm, and either instruct the IVR provider in response to the query or itself implement the behavior if the call was forwarded to the simulation system. For example, the simulation server may map the caller identifier 123-456-7890 to a simulation module, model, function, script, etc., and derives the behavior from the simulation module. The model describes the behavior not just of a single recipient, but of a large number of recipients (hence the "mass" recipient emulator). One model, for example, might dictate that 20% of the recipients will pick up the phone, listen to the entirety of the message, then press the requisite key to confirm receipt, then hangup, whereas 10% will not pick up the phone, 30% will pick up and listen to part of the message, etc. Another model (triggered by a different caller ID), might use different percentages for similar mass behaviors Thus, system may, as an example, wait 5 seconds and then press "1" in response to the caller identifier 123-456-7890. The notifications system will interpret the results of the call and may generate a call receipt for reporting purposes. In the event that the simulation server has no simulation mapped to a caller identifier, an empty response can be returned to the IVR provider and an error can be submitted as the call response.

Figure 15A:
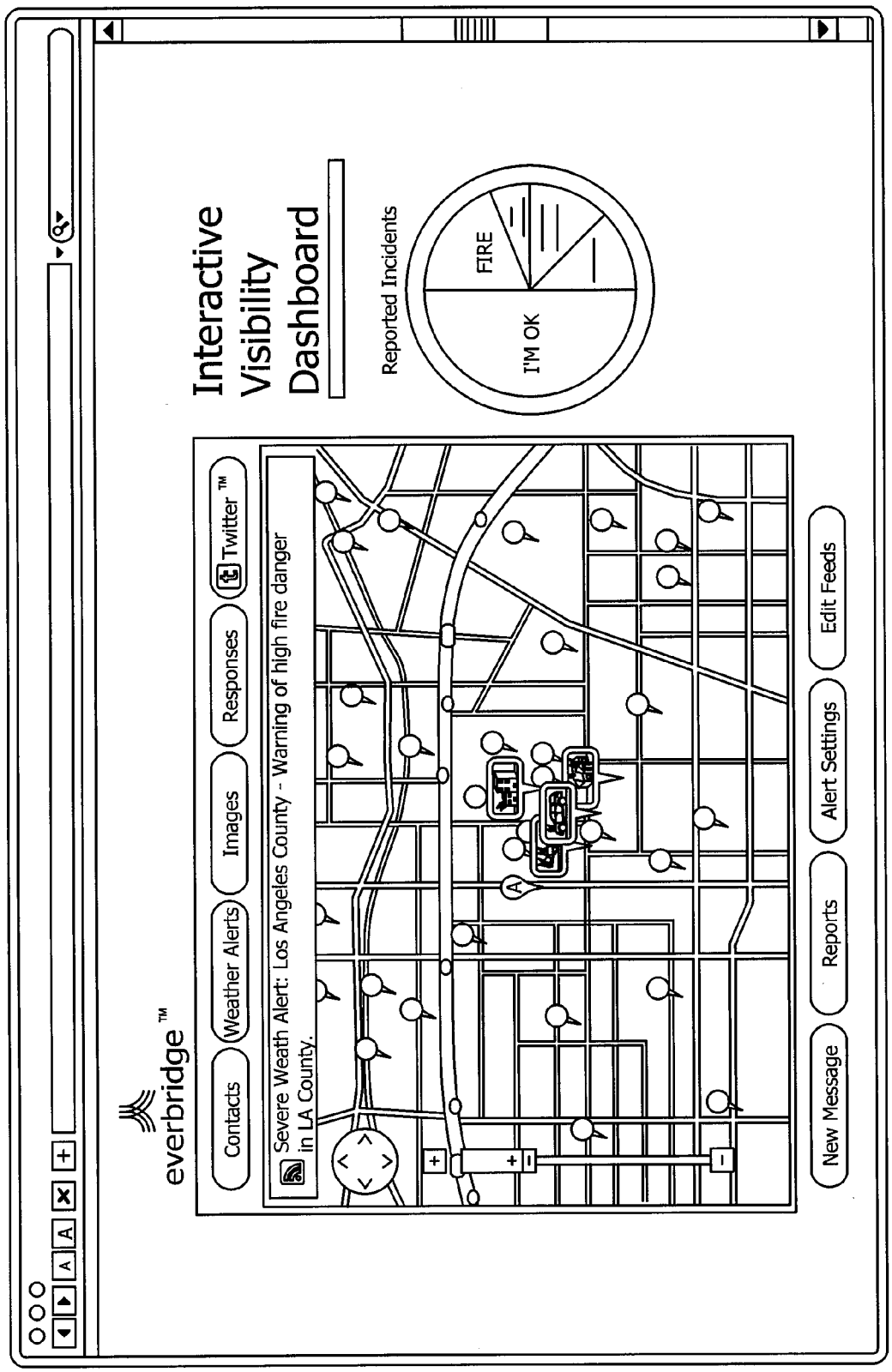
FIGS. 15A and 15B illustrate an interactive visibility dashboard interface, according to an embodiment.
Figure 15B:
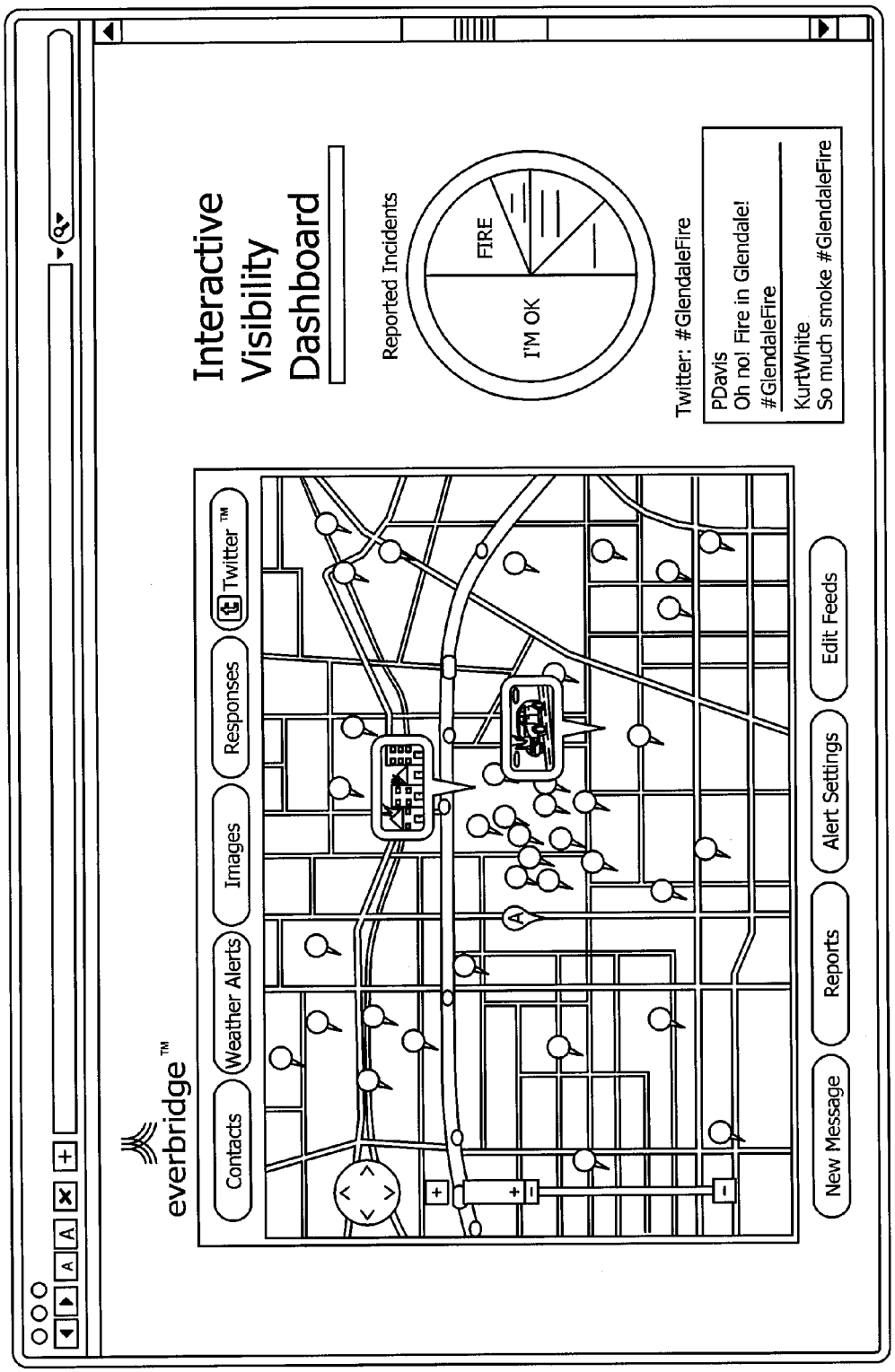

In an embodiment, a mobile application can be provided to end users of the notifications system. The mobile application can reside and be executed on an end user's mobile device, and provide interactive visibility with full, geographically aware interactive communication. A geographical map of the customer- or system-defined universe can be provided via the application, providing simultaneous visibility and interactivity. For instance, as illustrated in FIGS. 15A and 15B, a map-based status display of notifications and rich-content responses and submissions from recipients can be displayed on the screen of the mobile device. The application provides or receives (e.g., from a remote server) real-time processing, analysis and geographical mapping of structured and social media feeds. Furthermore, customizable alert settings enable organizations to be notified when critical response and submission thresholds have been reached.

Figure 14C:
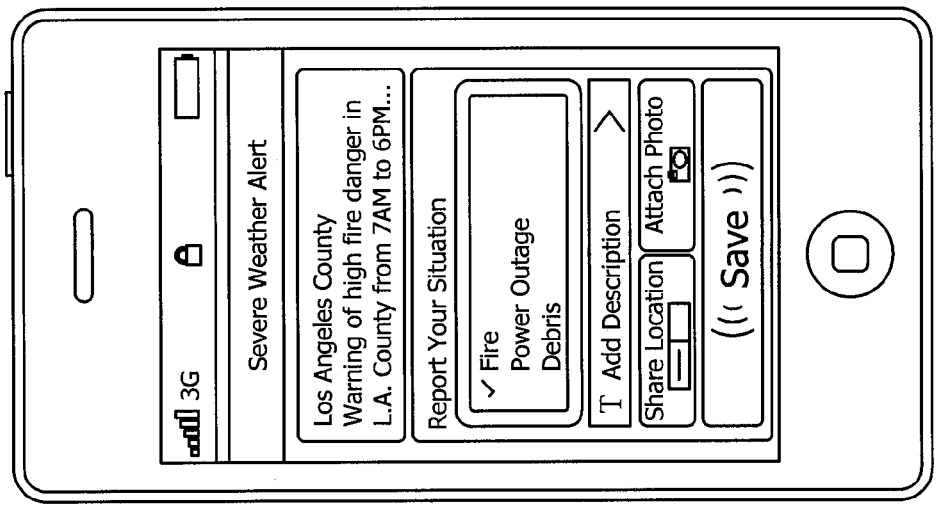
FIGS. 14A, 14B and 14C illustrate example user interfaces of a mobile application which can be used with a notifications system, according to an embodiment.
Figure 14B:
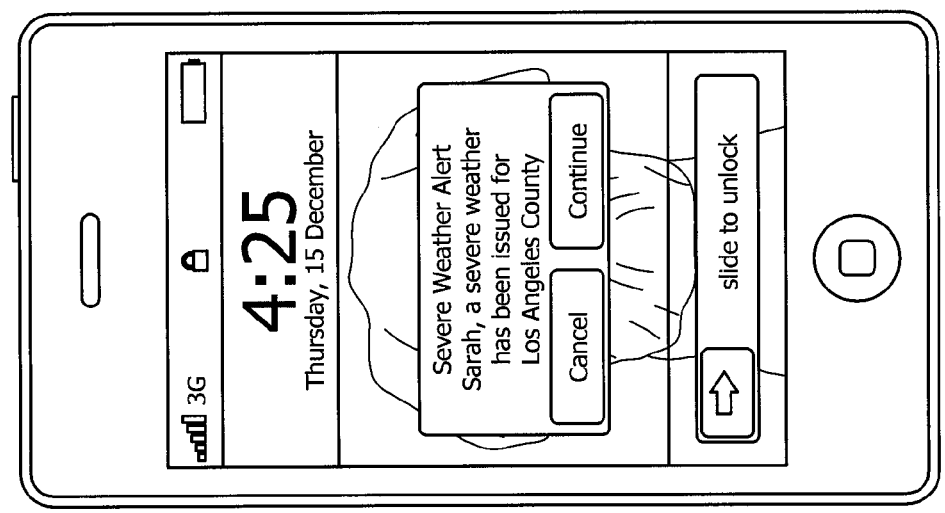
Figure 14A:
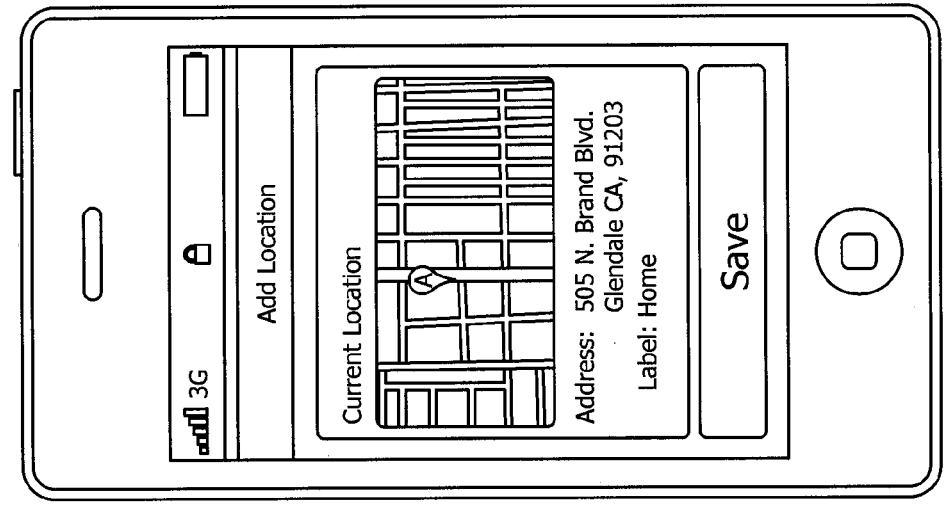

FIGS. 14A-14C illustrate some example user interfaces of the mobile application, according to an embodiment. Using the interface in FIG. 14A, the mobile application can receive the user's location, for example, from a global positioning system (GPS) sensor connected or integral to the mobile device. For example, using the user interface in FIG. 14A, the location may be manually entered or may be received from a GPS antenna integral to the mobile device.

As shown in FIG. 14B, a user can receive a notification from the notifications system, which informs the user of an emergency. In this example, the emergency is a severe weather alert. In response to the notification, the user can report the situation at the user's location. For example, as shown in FIG. 14C, the user interface can comprise an input (e.g., a selectable list of situations) for entering the situation at the user's location. Using the user interface in FIG. 14C, the user can compose a response by selecting from a list of possible situations (e.g., fire, power outage, debris, etc.), add a description if desired, share the user's location, and/or attach media (e.g., photograph or other image, video, or other rich media or content). A photograph may be captured by a camera or other optical device connected or integral to the mobile device. After entering the information, the user can then send a response comprising the information to the notifications system.

FIGS. 15A and 15B illustrate an interactive visibility dashboard interface, according to an embodiment. As shown in FIG. 15A, a dashboard can be displayed on the screen of the mobile device. The screen comprises a map image with icons to indicate the location on the map of reports received by the notification system from a plurality of users. The icons can be color-coded to indicate the situation at the location represented by the icon. For example, different situations can be depicted by different colors. In the illustrated embodiment, fire is represented by a first color (e.g., red), power outages are represented by a second color (e.g., blue), debris is represented by a third color (e.g., yellow), locations without any issues are represented by a fourth color (e.g., green), and locations to which a notification was sent but from which a response has not been received can be represented by a fifth color (e.g., gray). As shown, a legend can be provided for quick reference for the user. In addition, if responses associated with an icon included an image, a thumbnail of the image can be displayed with the icon. A user of the mobile application can click or touch an icon using a touch-screen integral to the mobile device or other input device to view more details about the situation at the location represented by the icon (e.g., the information submitted with the response associated with the icon). The user can also select other inputs of the mobile application, for example, to filter icons, send a new message or response, edit alert settings, edit feeds, etc.

FIG. 15B illustrates the same dashboard as in FIG. 15A, but with feeds overlaid on the display. For example, a Twitter feed is displayed, showing Tweets related to the emergency. In an embodiment, the notifications system can interface and/or interact with third-party structured and/or semi-structured data feeds, including social media feeds. Any dynamic data feed can be interfaced with the notifications system. For example, using geo-tagging, hurricane forecasting feeds can be overlaid directly on top of the universe displayed in the interactive visibility interface. If the hurricane feed contains multiple zones or bands indicating the impact zones, the notifications system can interact directly with the feed to send notifications (either automatically or in response to a manual input) to all employees, citizens, or other members of the system who live within the affected zones or bands.

Figure 16A:
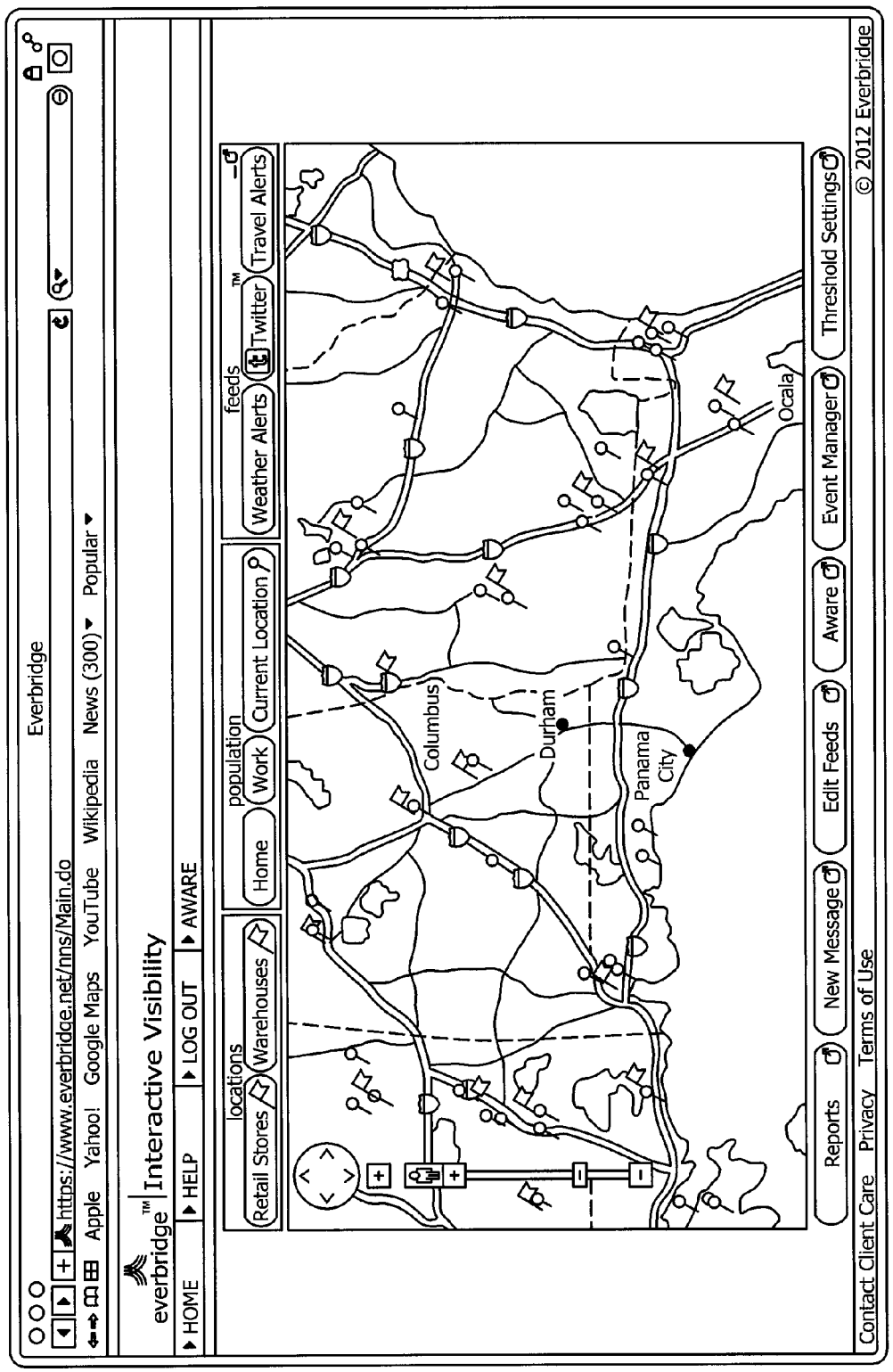
FIGS. 16A, 16B and 16C illustrate an interactive visibility dashboard interface, according to an embodiment.
Figure 16B:
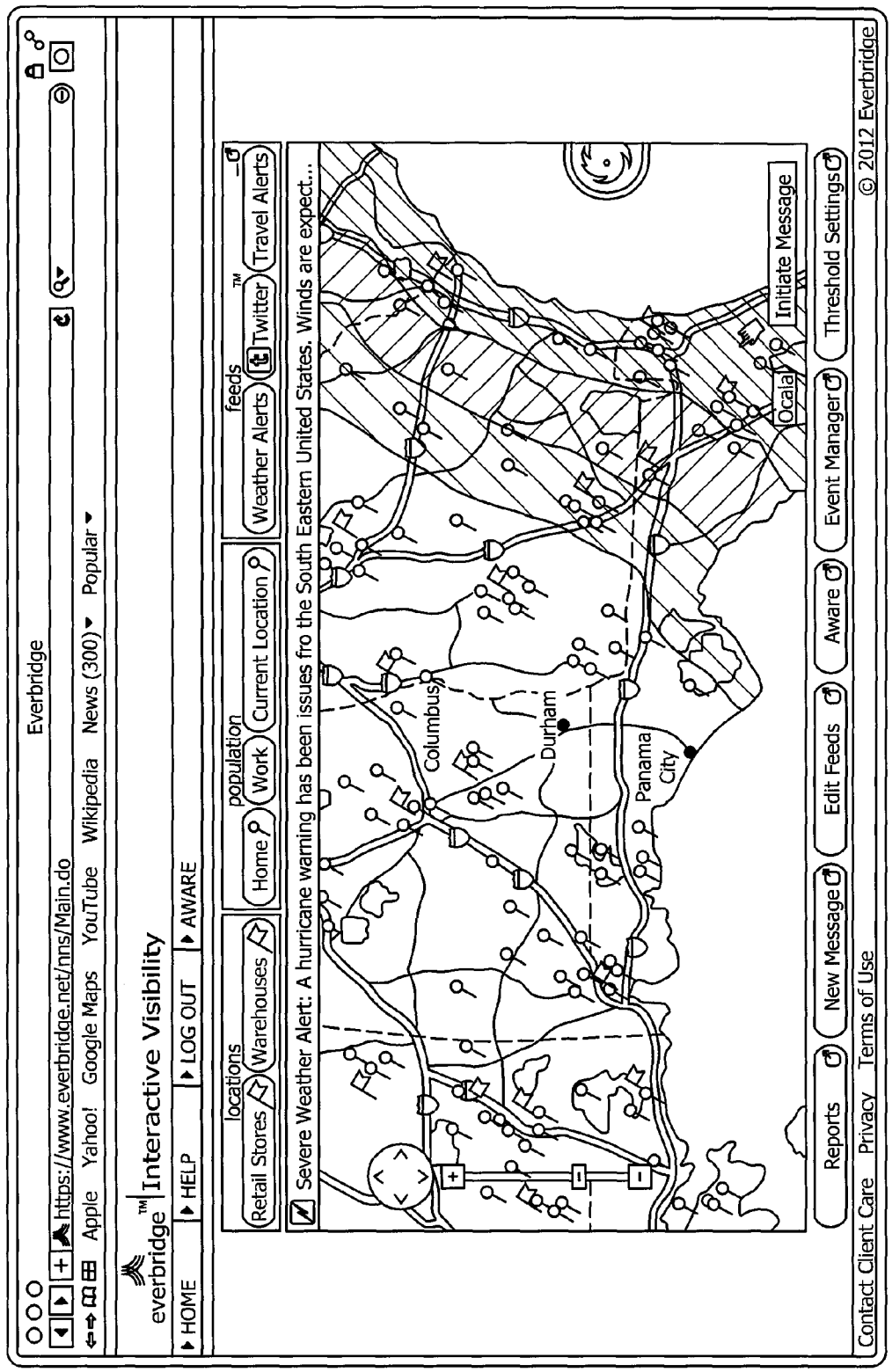

FIG. 16A illustrates an interactive visibility dashboard, according to an embodiment. As shown in FIG. 16B, a hurricane forecasting feed has issued a hurricane warning for part of the universe served by the dashboard. The affected zones can be illustrated in the dashboard using overlays, which may be color-coded (e.g., with different colors representing different severities). An operator can initiate a message to one or more of the zones by clicking on the zone or other input. Alternatively, messages can be initiated automatically in response to information received from the hurricane forecasting feed.

Figure 16C:
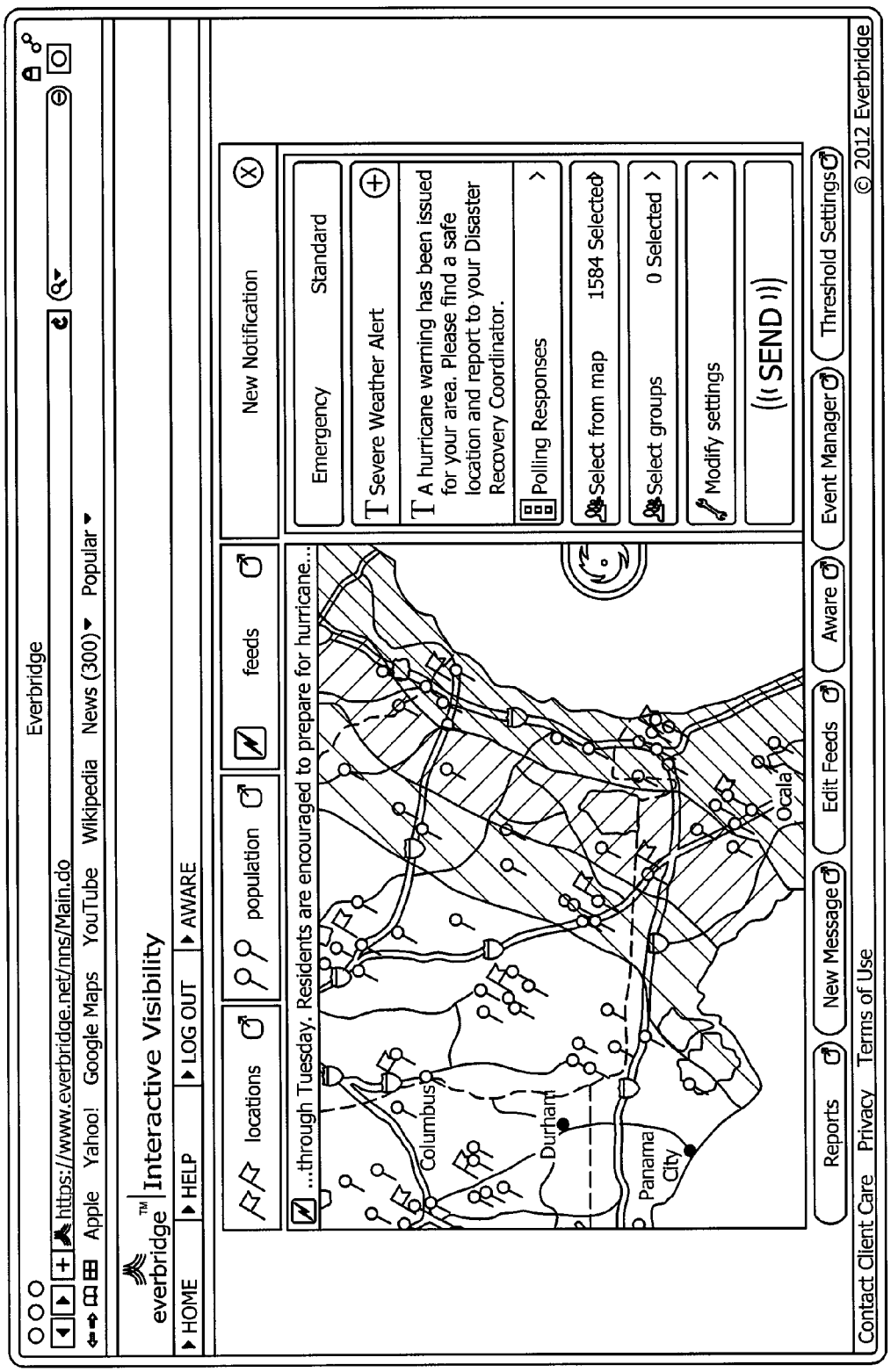

FIG. 16C illustrates the interactive visibility dashboard after the creation of a new notification, according to an embodiment. As illustrated, an operator or the system can construct a notification. For instance, the notification can be constructed from a stored template, which may comprise fields that can be customized to a particular situation. In the illustrated example, the operator has created a message for notifying recipients in one of the affected zones of a severe weather alert. The notification can include further details about the weather alert (e.g., that a hurricane warning has been issued) and instructions (e.g., find a safe location and/or report to a coordinator). Once the operator has constructed or generated the alert, the operator can select an input which initiates sending of the alerts to the specified recipients.

In an embodiment, the notifications system can receive social media data. The social media data is processed and analyzed, and combined with the visibility interface, e.g., using overlays as described above. For example, with respect to Twitter, an operator or user can specify that the notifications system monitor a particular hashtag. Hashtags (e.g., "#topic") are used to identify groups and topics. Filter criteria can be specified. The criteria may comprise one or more keywords, as well as geographic constraints pertaining to the origin of tweets. The user may also specify static or dynamic alert thresholds that must be reached before the system will "flag" a particular event. For example, a user can specify an alert threshold, whereby, if a certain number of tweets adhering to a hashtag and/or filter criteria are detected by the notifications system monitoring the Twitter feed, the event is flagged. For a particularly active hashtag, the criteria can be more complex. For example, the user can create an alert, whereby the notifications system only reacts or flags the event if the percentage of tweets for that hashtag, containing one or more keywords or linked images, exceeds a set threshold. The thresholds can also be set up based on mass-notification-specific sentiment analysis, which is derived from the lexical and semantic analysis of the contents of filtered tweets, and classified based on user-defined sentiments, such as "anxious," "safe," and the like. While embodiments have been described in the context of Twitter and tweets, it should be understood that the disclosed embodiments can, in the same manner, incorporate the same disclosed systems and methods with other social media feeds.

Figure 17A:
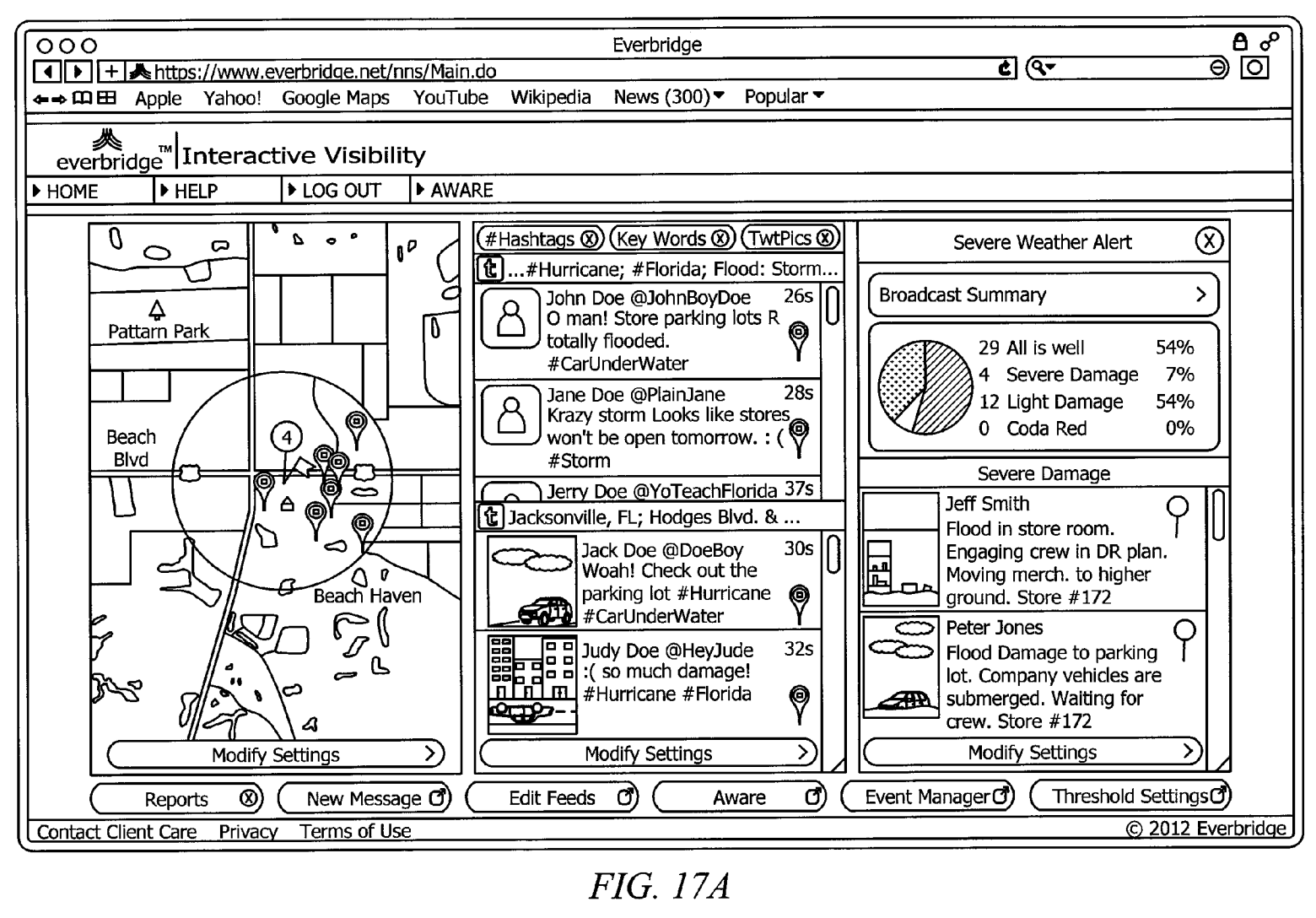
Figure 17B:
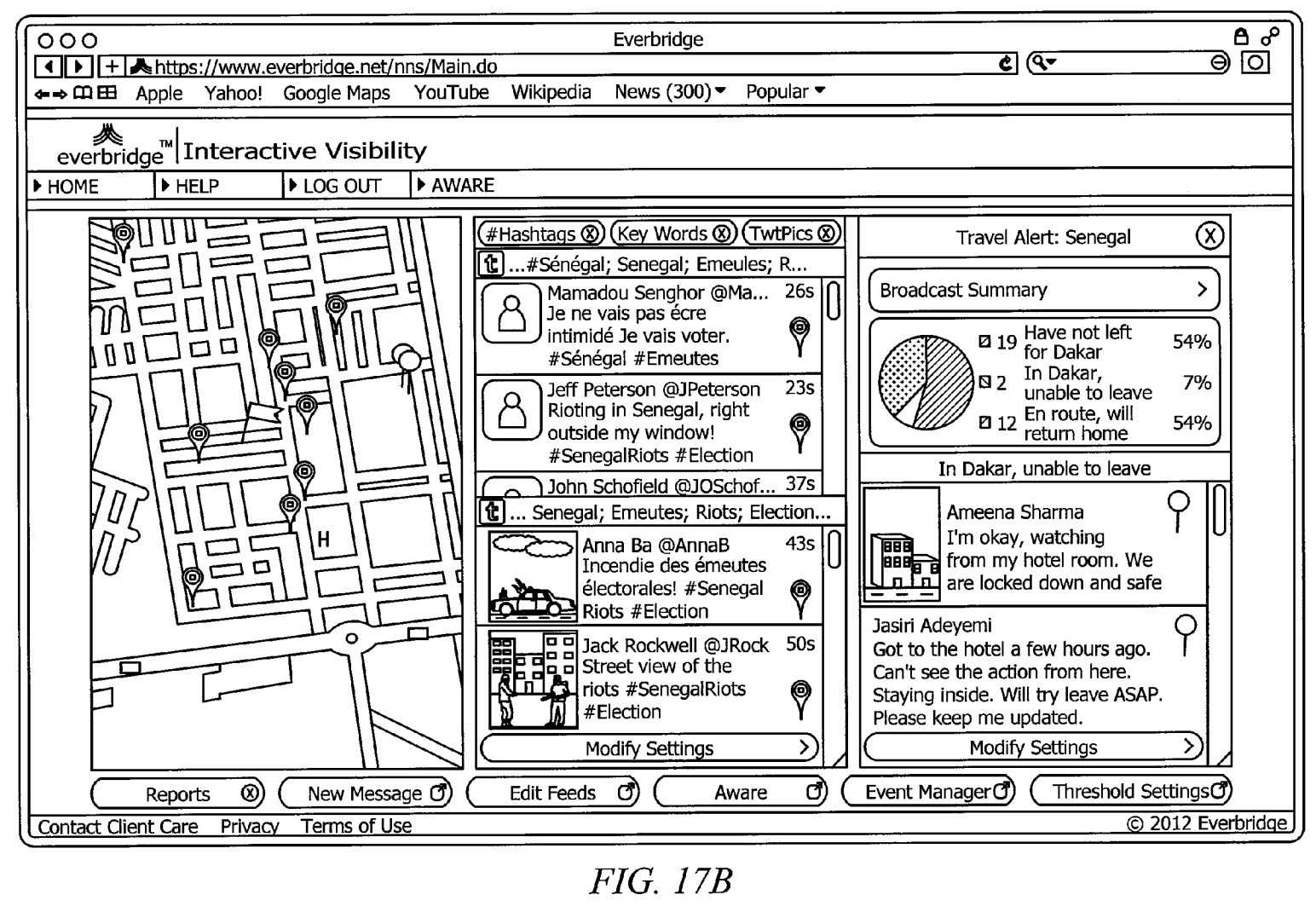

FIGS. 17A and 17B illustrate an interactive visibility dashboard which incorporates social media feeds, according to an embodiment. As illustrated, the dashboard can comprise a map section of the affected area, as well as a variety of social media feeds. For example, the dashboard can comprise a real-time feed of tweets that comprise specified hashtag(s) and filter criteria (e.g., keywords, geographic origin, etc.). In the illustrated embodiment, one section displays tweets, and a separate section displays tweets that comprise images. The locations of the tweets can be indicated (e.g., using icons) on the map section. A summary or other report can also be displayed. In the illustrated embodiment, the summary specifies the percentages of the different response types received (e.g., "all is well," "severe damage," "light damage," "code red"). The dashboard can also comprise a section displaying responses received from recipients of notifications sent by the notifications system. These responses may comprise text, images, video, and/or other content or media (e.g. describing or showing damage).

Those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A system for testing a notification system by simulating phone calls to recipients comprising:
   a receiver configured to receive inbound phone calls; and
   a processor coupled to the receiver and configured to provide a mass recipient emulator, said mass recipient emulator configured to:
      determine a model for end user behavior based on caller identification information associated with the inbound phone calls;
      simulate said end user behavior, said behavior selected from the group consisting of: hanging up after hearing or during a greeting, listening to a few seconds of a message and then hanging up, responding to a message, and listening to a message multiple times; and
      derive optimal notification characteristics from historical usage data collected by the notification system during the simulating.

2. The system of claim 1, wherein said model for said simulated end user behavior is specified by an operator.

3. The system of claim 1, wherein said model for said simulated end user behavior is derived from the historical usage data collected by the notification system.

4. The system of claim 1, wherein different models are associated with different caller identification information.

5. The system of claim 1, wherein said model indicates one or more percentages corresponding to percentages of end users that perform each behavior, and wherein said behavior is determined from said model based on the one or more percentages.

6. The system of claim 1, wherein the optimal notification characteristics comprise sending two or more notifications of different types to a recipient.

7. The system of claim 6, wherein the two or more notifications of different types are sent in a particular order.

8. The system of claim 7, wherein the two or more notifications of different types comprise a short message service (SMS) message and a phone call, and wherein the particular order indicates that the SMS message is to be followed by the phone call.

9. The system of claim 1, wherein the optimal notification characteristics comprise sending a notification of a predetermined length to a recipient.

10. The system of claim 1, wherein the mass recipient emulator is further configured to receive feedback information and to modify the model based at least on the feedback information.

11. The system of claim 1, further comprising one or more interactive voice response (IVR) systems configured to:
receive at least one of the inbound phone calls;
identify caller identification information for the at least one inbound phone call; and
query the mass recipient emulator with the caller identification information for the at least one inbound phone call.

12. The system of claim 11, wherein the one or more IVR systems are configured to prompt a simulated end user for a response, and wherein said end user behavior specified by said model indicates a response for said prompt, and indicates a delay specifying a predetermined period of time before simulating a response to said prompt.

13. A method of testing a notification system comprising:
receiving a notification sent through a network;
linking the notification to a mass recipient emulator module;
querying the mass recipient emulator module to determine a behavior, wherein the behavior is associated with an action and a timing parameter for when the action is performed; and
utilizing the behavior to respond to the notification,
wherein the mass recipient emulator is configured to:
determine said behavior using a model, and wherein said model is determined based on caller identification information associated with the notification; and
derive optimal notification characteristics from historical usage data collected by the notification system during simulation.

14. The method of claim 13, wherein the notification comprises a phone call sent through a public switched telephone network.

15. The method of claim 13, wherein said model for said behavior is specified by an operator.

16. The method of claim 13, wherein said model for said behavior is derived from historical usage data.

17. The method of claim 16, wherein the mass recipient emulator is configured to derive optimal notification characteristics from the historical usage data.

18. The method of claim 13 wherein different models are associated with different caller identification information.

19. The method of claim 13, wherein said model indicates one or more percentages corresponding to percentages of end users that perform each behavior, and wherein said behavior is determined from said model based on the one or more percentages.

20. A non-transitory computer-readable storage medium storing instructions that, when executed by a processor, cause the processor to perform operations for testing a notification system by comprising:
receiving a notification sent through a network;
linking the notification to a mass recipient emulator module;
querying the mass recipient emulator module to determine a behavior, wherein the behavior is associated with an action and a timing parameter for when the action is performed; and
utilizing the behavior to respond to the notification,
wherein the mass recipient emulator is configured to:
determine said behavior using a model, and wherein said model is determined based on caller identification information associated with the notification; and
derive optimal notification characteristics from historical usage data collected by the notification system during simulation.

21. The non-transitory computer-readable storage medium of claim 20, wherein the notification comprises a phone call sent through a public switched telephone network.

22. The non-transitory computer-readable storage medium of claim 20, wherein said model for said behavior is specified by an operator.

23. The non-transitory computer-readable storage medium of claim 20, wherein said model for said behavior is derived from historical usage data.

24. The non-transitory computer-readable storage medium of claim 20, wherein different models are associated with different caller identification information.

25. The non-transitory computer-readable storage medium of claim 20, wherein said model indicates one or more percentages corresponding to percentages of end users that perform each behavior, and wherein said behavior is determined from said model based on the one or more percentages.

* * * * *